(12) United States Patent
Ruther et al.

(10) Patent No.: US 11,457,170 B2
(45) Date of Patent: Sep. 27, 2022

(54) METHODS AND SYSTEMS FOR THERMAL IMAGE DISPLAY

(71) Applicant: Snap-on Incorporated, Kenosha, WI (US)

(72) Inventors: Timothy Ruther, Carpentersville, IL (US); Gary Stefanik, Elmhurst, IL (US); Joshua Covington, San Juan Bautista, CA (US); Steven Miskovic, Gilberts, IL (US); Oswaldo Neri, Los Banos, CA (US)

(73) Assignee: Snap-on Incorporated, Kenosha, WI (US)

( * ) Notice: Subject to any disclaimer, the term of this patent is extended or adjusted under 35 U.S.C. 154(b) by 404 days.

(21) Appl. No.: 16/164,080

(22) Filed: Oct. 18, 2018

(65) Prior Publication Data

US 2019/0052830 A1    Feb. 14, 2019

Related U.S. Application Data

(62) Division of application No. 15/233,634, filed on Aug. 10, 2016, now Pat. No. 10,506,193.

(Continued)

(51) Int. Cl.
  *H04N 5/445*  (2011.01)
  *G06F 3/048*  (2013.01)
  (Continued)

(52) U.S. Cl.
  CPC .......... *H04N 5/44504* (2013.01); *G01J 5/025* (2013.01); *G06F 3/048* (2013.01); *G06Q 10/20* (2013.01); *G06T 7/0004* (2013.01); *G06T 11/001* (2013.01); *H04N 5/232945* (2018.08); *H04N 5/33* (2013.01); *G06F 3/0486* (2013.01);

(Continued)

(58) Field of Classification Search
  None
  See application file for complete search history.

(56) References Cited

U.S. PATENT DOCUMENTS 5,637,871 A   6/1997   Piety et al.
5,730,526 A   3/1998   Davis et al.
(Continued)

FOREIGN PATENT DOCUMENTS

EP   2744191 A2   6/2014
EP   2779631 A2   9/2014

OTHER PUBLICATIONS

The Snell Group, "Color Palette Choices", Thermal Imaging Blog from Fluke Thermography, Wayback machine retrieval of screenshot with a date of Aug. 5, 2013. (Year: 2013).*
FLIR AX8 Automated, multi-speclial temperature sensor for condition monitoring and hot spot detection, technical Specifications created Sep. 2014 (4 pages).
(Continued)

*Primary Examiner* — Stefan Gadomski
(74) *Attorney, Agent, or Firm* — McDonnell Boehnen Hulbert & Berghoff LLP

(57) ABSTRACT

An example method is performed by a thermal imaging device. The method includes capturing a thermal image of a vehicle and displaying the thermal image within a first region of a display of the thermal imaging device. The method further includes displaying information related to servicing the vehicle within a second region of the display that is distinct from the first region. Other example methods performed by a thermal imaging device are also disclosed herein.

15 Claims, 25 Drawing Sheets

Related U.S. Application Data

(60) Provisional application No. 62/364,293, filed on Jul. 19, 2016.

(51) Int. Cl.

| | | |
|---|---|---|
| *G06Q 10/00* | (2012.01) | |
| *G01J 5/02* | (2022.01) | |
| *H04N 5/232* | (2006.01) | |
| *G06T 7/00* | (2017.01) | |
| *G06T 11/00* | (2006.01) | |
| *H04N 5/33* | (2006.01) | |
| *H04N 9/04* | (2006.01) | |
| *G06F 3/04817* | (2022.01) | |
| *G06F 3/0486* | (2013.01) | |

(52) U.S. Cl.
CPC ............... *G06F 3/04817* (2013.01); *G06T 2207/10048* (2013.01); *G06T 2207/30248* (2013.01); *H04N 9/04513* (2018.08)

(56) References Cited

U.S. PATENT DOCUMENTS

| | | | |
|---|---|---|---|
| 5,942,753 A | 8/1999 | Dell | |
| 7,058,901 B1 | 6/2006 | Hafey et al. | |
| 7,224,991 B1* | 5/2007 | Fuoss | H04W 4/12 345/173 |
| 7,693,679 B1* | 4/2010 | Warnke | G01J 5/02 116/207 |
| 8,024,658 B1 | 9/2011 | Fagans et al. | |
| 8,253,105 B1 | 8/2012 | Warnke et al. | |
| 8,300,981 B1 | 10/2012 | Praly et al. | |
| 8,335,606 B2 | 12/2012 | Mian et al. | |
| 8,817,106 B2* | 8/2014 | Richardson | H04N 5/23245 250/330 |
| 9,109,945 B1* | 8/2015 | Warnke | G06F 3/04847 |
| 9,134,185 B2 | 9/2015 | Mian et al. | |
| 9,604,563 B1 | 3/2017 | Wilson, II et al. | |
| 10,013,140 B2* | 7/2018 | Abellera | G06F 3/0482 |
| 2004/0071186 A1 | 4/2004 | Ignatowicz | |
| 2004/0245467 A1 | 12/2004 | Lannestedt | |
| 2005/0145794 A1 | 7/2005 | Faubion | |
| 2006/0033998 A1 | 2/2006 | King | |
| 2006/0091310 A1 | 5/2006 | Furry | |
| 2006/0180760 A1 | 8/2006 | Lane et al. | |
| 2007/0040911 A1 | 2/2007 | Riley | |
| 2008/0028846 A1 | 2/2008 | Heath et al. | |
| 2008/0126982 A1 | 5/2008 | Sadikali et al. | |
| 2008/0187215 A1* | 8/2008 | Gordon | H04N 1/6058 382/162 |
| 2009/0018721 A1 | 1/2009 | Mian et al. | |
| 2009/0248235 A1 | 10/2009 | Hering et al. | |
| 2009/0256693 A1 | 10/2009 | Brinton et al. | |
| 2010/0107068 A1 | 4/2010 | Butcher et al. | |
| 2010/0148066 A1 | 6/2010 | Stratmann et al. | |
| 2010/0164992 A1 | 7/2010 | Akiya | |
| 2010/0199227 A1 | 8/2010 | Xiao et al. | |
| 2010/0302130 A1 | 12/2010 | Kikuchi et al. | |
| 2011/0154406 A1 | 6/2011 | Koo et al. | |
| 2011/0211073 A1 | 9/2011 | Foster | |
| 2011/0231791 A1 | 9/2011 | Itahana | |
| 2011/0314401 A1 | 12/2011 | Salisbury et al. | |
| 2012/0069049 A1 | 3/2012 | Howe et al. | |
| 2012/0078113 A1 | 3/2012 | Whitestone et al. | |
| 2012/0182316 A1 | 7/2012 | Moha et al. | |
| 2012/0224063 A1* | 9/2012 | Terre | G08B 13/1963 348/148 |
| 2012/0314084 A1* | 12/2012 | Lammert | G01J 5/02 348/164 |
| 2013/0028477 A1 | 1/2013 | Schmieder et al. | |
| 2013/0050453 A1 | 2/2013 | Bergstrom et al. | |
| 2013/0188058 A1* | 7/2013 | Nguyen | G01J 5/02 348/164 |
| 2013/0219343 A1 | 8/2013 | Nan et al. | |
| 2013/0307992 A1* | 11/2013 | Erlandsson | G06F 16/58 348/164 |
| 2014/0013201 A1 | 1/2014 | Erlandsson et al. | |
| 2014/0028854 A1 | 1/2014 | Heinke et al. | |
| 2014/0036068 A1* | 2/2014 | Nguyen | G01J 5/12 348/135 |
| 2014/0042319 A1 | 2/2014 | Pickett et al. | |
| 2014/0071323 A1 | 3/2014 | Yi et al. | |
| 2014/0111634 A1* | 4/2014 | Mueckl | G02B 23/2476 348/82 |
| 2014/0173459 A1 | 6/2014 | Gaiser et al. | |
| 2014/0195099 A1 | 7/2014 | Chen | |
| 2014/0201022 A1 | 7/2014 | Balzer | |
| 2014/0267353 A1* | 9/2014 | Schmidt | G06T 11/001 345/589 |
| 2014/0267757 A1 | 9/2014 | Abramson et al. | |
| 2014/0313343 A1* | 10/2014 | Frank | H04N 5/33 348/164 |
| 2015/0009336 A1 | 1/2015 | Want | |
| 2015/0022667 A1 | 1/2015 | McManus et al. | |
| 2015/0049941 A1 | 2/2015 | Hall | |
| 2015/0098663 A1 | 4/2015 | Heinke | |
| 2015/0181136 A1 | 6/2015 | Reinpoldt et al. | |
| 2015/0206357 A1 | 7/2015 | Chen et al. | |
| 2015/0269742 A1 | 9/2015 | Bergstrom et al. | |
| 2015/0304636 A1 | 10/2015 | Rhead et al. | |
| 2016/0033336 A1* | 2/2016 | Halverson | H04N 7/183 348/82 |
| 2016/0231833 A1* | 8/2016 | Gu | G06F 3/03545 |
| 2016/0291861 A1 | 10/2016 | Song et al. | |
| 2016/0300341 A1 | 10/2016 | Hay et al. | |
| 2016/0343118 A1 | 11/2016 | Olsen | |
| 2016/0373662 A1 | 12/2016 | Olsen | |
| 2017/0054923 A1 | 2/2017 | Thompson | |
| 2017/0064617 A1 | 3/2017 | Buttolo et al. | |
| 2017/0200122 A1 | 7/2017 | Edson et al. | |
| 2017/0257414 A1 | 9/2017 | Zaletel | |
| 2017/0372533 A1 | 12/2017 | Merg et al. | |
| 2018/0239784 A1 | 8/2018 | Solli et al. | |

OTHER PUBLICATIONS

FLIR AX8 Marine Thermal Monitoring System, technical specifications created Sep. 2015 (4 pages).

FLIR AX8 Thermal Imaging Camera for Continuous Condition and Safety Monitoring, technical specifications created Sep. 2014 (2 pages).

FLIR C2 Powerful, Compact Thermal Imaging System, technical specifications created Nov. 2014 (2 pages).

FLIR C2 Powerful, Compact Thermal Imaging System Frequently Asked Questions, brochure created Nov. 2014 (2 pages).

FLIR C2 Powerful, Compact Thermal Imaging System, How II Works, brochure created Jan. 2015 {1 page).

FLIR C2 Powerful Pocket-Portable Thermal Imaging, technical specifications updated Nov. 16, 2015 (3 pages).

FLIR Camera Controller GUI User's Guide, Document No. 102-PS242-02, Version 120, issued May 2014 (65 pages).

FLIR Instruction Manual FLIR TCX Thermal Cameras, Publication No. LX400062, modified Dec. 3, 2015, Formalled May 27, 2016 (150 pages).

FLIR Lepton Camera Breakout v1.4, technical specifications created Nov. 21, 2014 (4 pages).

FLIR Lepton, FLIR Systems, Change the way you see the world! See What Micro Thermal Imaging Can Do, product List downloaded Sep. 7, 2017 from http://www.ftir.com/cores/contenl/?id=66257 (4 pages).

FLIR Lepton Long Wave Infrared (LWIR) Datasheet, Version 1.2.3, Oct. 15, 2014 (50 pages).

FLIR Lepton Longwave Infrared (LWIR) Camera Module, technical specifications updated Jun. 12, 2015 (2 pages).

FLIR Lepton with Radiometry Datasheet, No. 500-0763-01-09, Rev. 110, Nov. 12, 2016 (74 pages).

FLIR Scout TK Thermal Monocular User Manual No. 4204190, Rev. 1, May 23, 2016 (16 pages).

FLIR TG130 Spot Thermal Camera, technical specifications created Dec. 30, 2015 (2 pages).

(56) References Cited

OTHER PUBLICATIONS

FLIR TG165 Imaging IR Thermometer, technical specifications created Aug. 2014 (2 pages).
FLIR TG165 Spot Thermal Camera, technical specifications revised Nov. 2015 (2 pages).
FLIR Thermal Imaging for Machine Vision and Industrial Safety Applications, brochure and technical specifications created Aug. 2014 (12 pages).
European Search Report, European Patent Publication No. EP 2 744 191 A3, dated Jun. 10, 2015 (5 pages).
European Search Report, European Patent Publication No. EP 2 779 631 A3, dated Oct. 1, 2014 (3 pages).
International Search Report, International Application No. PCT/US2017/038300, dated Sep. 4, 2017 (4 pages).
Written Opinion of the International Searching Authority, International Application No. PCT/US2017/038300, dated Sep. 4, 2017 (8 pages).
U.S. Appl. No. 15/233,634, filed Aug. 10, 2016; inventors: Timothy Ruther, Gary Stefanik, Joshua Covington, Steven Miskovic, Oswaldo Neri.
U.S. Appl. No. 16/164,111, filed Oct. 18, 2018; inventors: Timothy Ruther, Gary Stefanik, Joshua Covington, Steven Miskovic, Oswaldo Neri.
The International Bureau of WIPO, International Preliminary Report on Patentability, International Application No. PCT/US2017/038300, dated Jan. 22, 2019.
Cfrey; Electrical diagnostics: going beyond the volt meter; Search Auto Parts.com Jan. 2016 https://web.archive.org/web/20160208095244/htttp://www.searchautoparts.com/motorage/undercar-service-repair/electrical-diagnostics-going-beyond-volt-meter.
International Preliminary Report on Patentability, International Application No. PCT/US2017/038300, dated Jan. 22, 2019 (7 pages).
Koschan, Andreas & Govindasamy, Priya & Sukumar, Sreenivas Rangan & Page, David & Abidi, Mongi & Gorsich, David. (2006). Thermal Modeling and Imaging of As-built Vehicle Components. 10.4271/2006-01-1167. (Year: 2006).

\* cited by examiner

SETTINGS MODE CONTINUED

Recalibrating Mode

METHODS AND SYSTEMS FOR THERMAL IMAGE DISPLAY

CROSS REFERENCE TO RELATED APPLICATION

The present application is a divisional of and claims priority to U.S. patent application Ser. No. 15/233,634, filed on Aug. 10, 2016, which claims priority to U.S. Provisional Patent Application No. 62/364,293, filed on Jul. 19, 2016, the entire contents of both of which are herein incorporated by reference.

BACKGROUND

Many products produced by manufacturers occasionally have to be repaired. Thermal imaging devices can be useful to repair such products.

Displays of current thermal imaging devices are generally configured as "one-tone" displays. This simplifies the processing associated with displaying thermal images. Additional information (such as a thermal "map") can be superimposed on top of a displayed thermal image. This process may hide some of the information present in the displayed thermal image. To access the additional information, the user generally may navigate multiple displays of a user interface.

OVERVIEW

In an example, a method is performed by a thermal imaging device. The method includes capturing a thermal image of a vehicle and displaying the thermal image within a first region of a display of the thermal imaging device. The method further includes displaying information related to servicing the vehicle within a second region of the display that is distinct from the first region.

In another example, a non-transitory computer readable medium stores instructions that, when executed by a thermal imaging device, cause the thermal imaging device to perform functions. The functions include capturing a thermal image of a vehicle and displaying the thermal image within a first region of a display of the thermal imaging device. The functions further include displaying information related to servicing the vehicle within a second region of the display that is distinct from the first region.

In yet another example, a thermal imaging device includes one or more processors, a thermal image sensor, and a non-transitory computer readable medium storing instructions that, when executed by the one or more processors, cause the thermal imaging device to perform functions. The functions include capturing a thermal image of a vehicle and displaying the thermal image within a first region of a display of the thermal imaging device. The functions further include displaying information related to servicing the vehicle within a second region of the display that is distinct from the first region.

In yet another example, a method is performed by a thermal imaging device. The method includes capturing a thermal image and displaying the captured thermal image within a first region of a display of the thermal imaging device. The displayed thermal image conforms to a first color palette that maps temperatures to a color or a brightness level. The method further includes displaying one or more color palette icons within a second region of the display that is distinct from the first region. The one or more color palette icons respectively represent additional color palettes that map temperatures to a color or a brightness level. The method further includes receiving input representing a selection of a color palette icon of the one or more color palette icons. The method further includes displaying, within the first region, a thermal image that conforms to a second color palette that corresponds to the selected color palette icon.

In yet another example, a non-transitory computer readable medium stores instructions that, when executed by a thermal imaging device, cause the thermal imaging device to perform functions. The functions include capturing a thermal image and displaying the captured thermal image within a first region of a display of the thermal imaging device. The displayed thermal image conforms to a first color palette that maps temperatures to a color or a brightness level. The functions further include displaying one or more color palette icons within a second region of the display that is distinct from the first region. The one or more color palette icons respectively represent additional color palettes that map temperatures to a color or a brightness level. The functions further include receiving input representing a selection of a color palette icon of the one or more color palette icons. The functions further include displaying, within the first region, a thermal image that conforms to a second color palette that corresponds to the selected color palette icon.

In yet another example, a thermal imaging device includes one or more processors, a thermal image sensor, and a non-transitory computer readable medium storing instructions that, when executed by the one or more processors, cause the thermal imaging device to perform functions. The functions include capturing a thermal image and displaying the captured thermal image within a first region of a display of the thermal imaging device. The displayed thermal image conforms to a first color palette that maps temperatures to a color or a brightness level. The functions further include displaying one or more color palette icons within a second region of the display that is distinct from the first region. The one or more color palette icons respectively represent additional color palettes that map temperatures to a color or a brightness level. The functions further include receiving input representing a selection of a color palette icon of the one or more color palette icons. The functions further include displaying, within the first region, a thermal image that conforms to a second color palette that corresponds to the selected color palette icon.

In yet another example, a method is performed by a thermal imaging device. The method includes capturing a first thermal image and displaying the first thermal image within a first region of a display of the thermal imaging device. The method further includes displaying, within a second region of the display that is distinct from the first region, one or more second thermal images captured by the thermal imaging device. The one or more second thermal images are compressed to be smaller than the first thermal image. The method further includes receiving input representing a selection of a thermal image of the one or more second thermal images, and in response to receiving the input, replacing, within the first region of the display, the first thermal image with an enlarged version of the selected thermal image. The enlarged version of the selected thermal image is equal in size to the displayed first thermal image.

In yet another example, a non-transitory computer readable medium stores instructions that, when executed by a thermal imaging device, cause the thermal imaging device to perform functions. The functions include capturing a first thermal image and displaying the first thermal image within a first region of a display of the thermal imaging device. The functions further include displaying, within a second region of the display that is distinct from the first region, one or more second thermal images captured by the thermal imaging device. The one or more second thermal images are compressed to be smaller than the first thermal image. The functions further include receiving input representing a selection of a thermal image of the one or more second thermal images, and in response to receiving the input, replacing, within the first region of the display, the first thermal image with an enlarged version of the selected thermal image. The enlarged version of the selected thermal image is equal in size to the displayed first thermal image.

In yet another example, a thermal imaging device includes one or more processors, a thermal image sensor, and a non-transitory computer readable medium storing instructions that, when executed by the one or more processors, cause the thermal imaging device to perform functions. The functions include capturing a first thermal image and displaying the first thermal image within a first region of a display of the thermal imaging device. The functions further include displaying, within a second region of the display that is distinct from the first region, one or more second thermal images captured by the thermal imaging device. The one or more second thermal images are compressed to be smaller than the first thermal image. The functions further include receiving input representing a selection of a thermal image of the one or more second thermal images, and in response to receiving the input, replacing, within the first region of the display, the first thermal image with an enlarged version of the selected thermal image. The enlarged version of the selected thermal image is equal in size to the displayed first thermal image.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

DETAILED DESCRIPTION

I. Introduction

Figure 1:
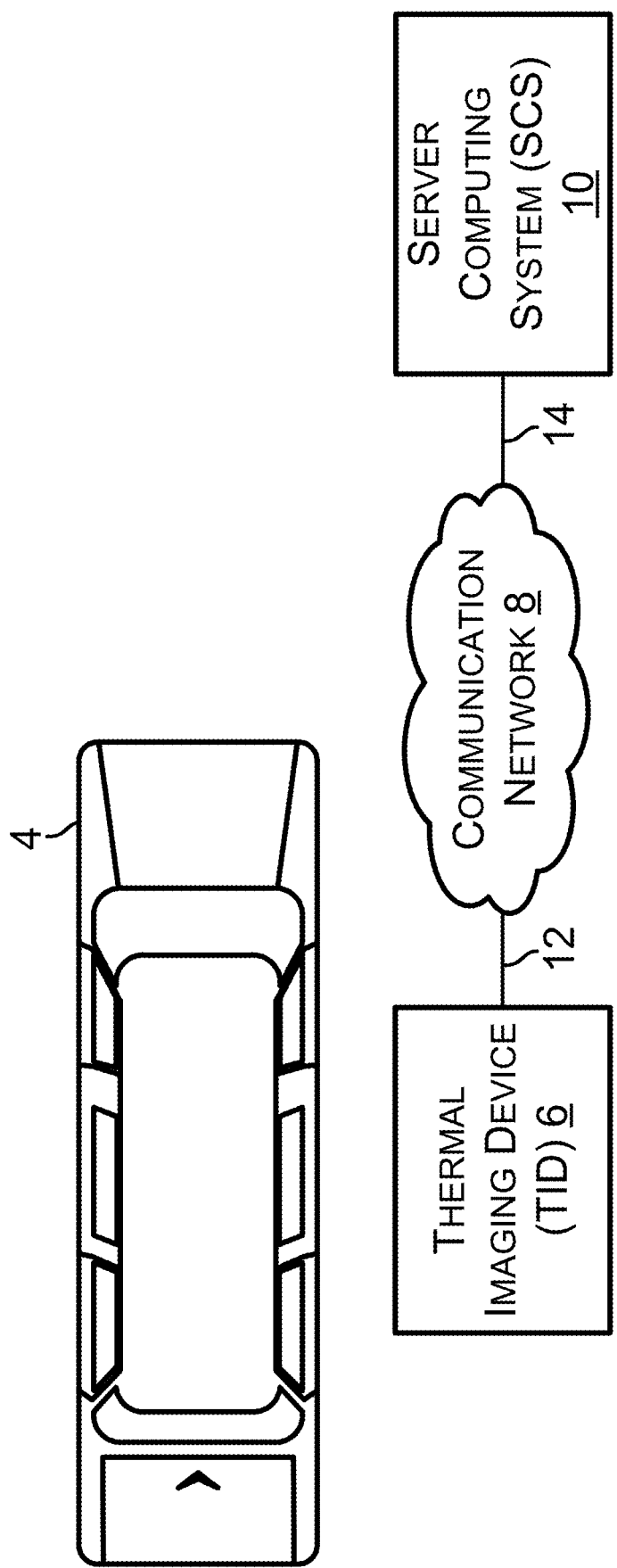
FIG. 1 is a block diagram of a thermal imaging device and a server computing system.

Within examples, a thermal imaging device may include a display (e.g., a liquid crystal display) that has a resolution that is greater than the resolution of a thermal image sensor of the thermal imaging device. In this context, thermal images captured by the thermal imaging device may have a resolution that is less than the resolution of the display. The "extra" display area may be used for the display of information that is related to vehicle diagnostics or repair. This information could include various "thumbnail" versions of a thermal image that is displayed in the main display area. The thumbnail images may represent different color display options (e.g., color pallets). This feature may allow the desired color display option to be quickly chosen and the displayed image to be modified accordingly. The extra display area may also facilitate display of troubleshooting tips without interrupting or obscuring display of the thermal image. Along these lines, troubleshooting tips and or a troubleshooting menu "tree" can be displayed for without interrupting display of the thermal image.

Although many of the example embodiments are described with respect to a vehicle, the example embodiments can be applicable to products or repairable items other than a vehicle. As an example, the other products or repairable items can include home appliances, such as a generator, a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements of a machine described herein can be carried out by a processor executing computer-readable program instructions or by any combination of hardware, firmware, or software.

II. Example Architecture

Referring to FIG. 1, a vehicle, such as vehicle 4, is a mobile machine that can be used to transport a person, people, or cargo. As an example, any vehicle described herein can be driven and/or otherwise guided along a path (e.g., a paved road or otherwise) on land, in water, or in the air or outer space. As another example, any vehicle described herein can be wheeled, tracked, railed, or skied. As yet another example, any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. As still yet another example, any vehicle described herein can include or use any appropriate voltage or current source, such as a battery, an alternator, a fuel cell, and the like, providing any appropriate current or voltage, such as about 12 volts, about 42 volts, and the like. As still yet another example, any of the vehicles described herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein can include an electronic control unit (ECU), a data link connector (DLC), and a vehicle communication link that connects the DLC to the ECU.

Some vehicles can be identified by characteristics of the vehicle such as when the vehicle was built (e.g., a vehicle model year), who built the vehicle (e.g., a vehicle make), marketing names associated with vehicle (e.g., a vehicle model name, or more simply "model"), and features of the vehicle (e.g., an engine type). This description uses an abbreviation YMME or Y/M/M/E, where each letter in the order shown represents a model year, vehicle make, vehicle model name, and engine type, respectively. This description uses an abbreviation YMM or Y/M/M, where each letter in the order shown represents a model year, vehicle make, and vehicle model name, respectively. An example Y/M/M/E shown in the drawings is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Mich.

A vehicle communication link within a vehicle can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

The thermal imaging device (TID) 6 may be used to capture and display thermal images of components of the vehicle 4. TID 6 may take the form of a computing device and be configured for communication with the server computing system (SCS) 10 via communication links 12 and 14, and communication network 8. The TID 6 may be depicted in further detail in FIG. 2.

The communication network 8 may include one or more computing devices networked via a wide-area network or a local area network. The communication network 8 may take the form of the internet, for example. As such, the communication links 12 and 14 may take the form of wired (e.g., Ethernet) or wireless (e.g., Bluetooth, Wifi, etc.) communication links.

The SCS 10 may take the form of one or more computing devices (e.g., a server). In some examples, the SCS 10 may store various information useful for repairing vehicles taking the form of various Y/M/M.

Figure 2:
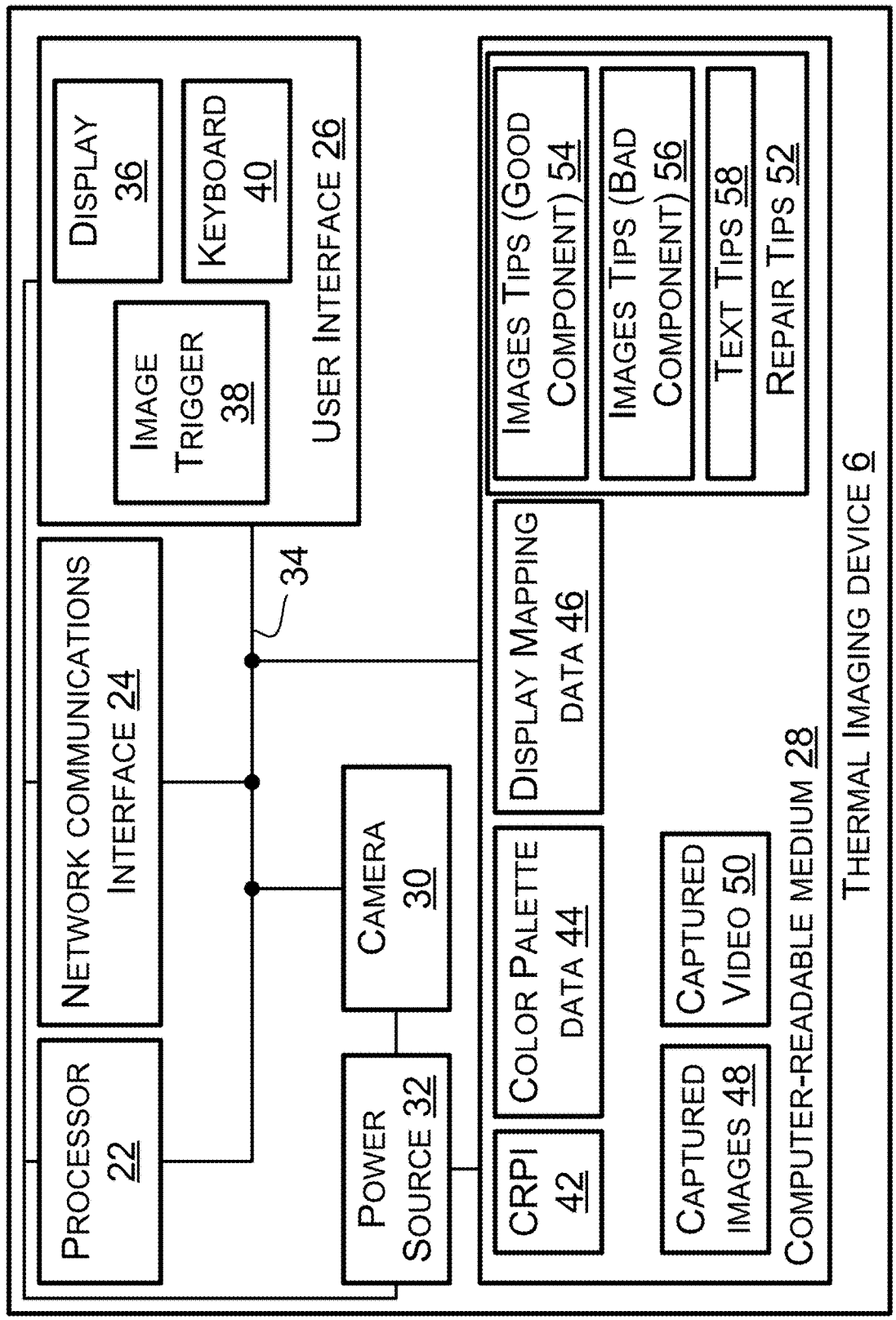
FIG. 2 is a block diagram of a thermal imaging device.

The TID 6 is depicted in FIG. 2. A processor such as the processor 22 or any other processor discussed in this description can include one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI). For example, the processor 22 can execute CRPI 42 stored in the computer-readable medium (CRM) 28. A processor can be configured to execute hard-coded functionality in addition to or as an alternative to software-coded functionality (e.g., via CRPI). The at least one processor of the processor 22 can be programmed to perform any function or combination of functions described herein as being performed by the TID 6.

A computer-readable medium such as the CRM 28 or any other CRM discussed in this description can include one or more CRM. A CRM can include a non-transitory CRM, a transitory CRM, or both a non-transitory CRM and a transitory CRM. A non-transitory CRM, or a portion thereof, can be located within or as part of a processor (e.g., within a single integrated circuit chip). A non-transitory CRM, or a portion thereof, can be separate and distinct from a processor.

A non-transitory CRM can include a volatile or non-volatile storage component, such as an optical, magnetic, organic or other memory or disc storage component. Additionally or alternatively, a non-transitory CRM can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory CRM can include, for example, CRPI provided over a communication link, such as the communication link 12 which is connected to or is part of the communication network 8. The communication link 12 can include a digital or analog communication link. The communication link can include a wired communication link including one or more wires or conductors, or a wireless communication link including an air interface.

A computer-readable medium can be referred to by other terms such as a "computer-readable storage medium," a "data storage device," a "memory device," a "memory," "computer-readable media," a "computer-readable database," "at least one computer-readable medium," or "one or more computer-readable medium." Any of those alternative terms can be preceded by the prefix "transitory" if the CRM is transitory or "non-transitory" if the CRM is non-transitory.

The CRM 28 can include CRPI 42, color palette data 44, display mapping data 46, captured images 48, captured video 50. The CRM 28 may also include repair tips 52 which may include image tips (good component) 54, image tips (bad component), and text tips 58.

The color palette data 44 may include one or more color palettes for mapping temperatures (e.g., wavelengths) represented by thermal image data to brightness levels and/or colors, as is known in the art. For example, a first color palette may map temperatures to various shades of orange and/or levels of brightness, whereas a second color palette may map temperatures to various shades of purple and/or levels of brightness.

Display mapping data 46 may include templates for displaying thermal images simultaneously with information related to servicing vehicles. For example, the user may select one of many display templates such that a thermal image of a vehicle and information related to servicing the vehicle are displayed at various relative locations within the display 36 based on the selected display template.

The captured images 48 may include image data corresponding to thermal images captured by the TID 6. The captured video 50 may include image data corresponding to thermal images captured as a video stream by the TID 6.

The image tips 54 may include images that are captured by the TID 6 and/or images that are received from the SCS 10. The image tips 54 may include thermal images of vehicle components that are known to be in good working order. The image tips 56 may include images that are captured by the TID 6. The image tips 56 may include thermal images of vehicle components that are known to be malfunctioning in one way or another. The TID 6 may receive the image tips 56 from the SCS 10. The SCS 10 may provide images tips 54 and/or image tips 56 in response to a request for images tips from the TID 6. The request for image tips may include a Y/M/M or Y/M/M/E of a vehicle to be diagnosed using the TID 6.

The text tips 58 may include textual suggestions for repairing vehicle components. For example, a user may navigate a menu displayed by the user interface 26 and choose text tips 58 that correspond to a particular component of a vehicle that is suspected of malfunctioning. The TID 6 may receive the text tips from the SCS in response to a request for text tips from the TID 6. The request for text tips may include a Y/M/M or Y/M/M/E of a vehicle to be diagnosed using the TID 6.

A network communications interface 24 can comprise a transceiver and a receiver. A transceiver can comprise one or more transceivers. Each transceiver can include one or more transmitters configured to transmit data onto a network, such as the communication network 8. Each transceiver can include one or more receivers configured to receive data carried over a network, such as the communication network 8. The data transmitted or received by a transceiver can comprise any data (e.g., repair tips, images, video, image tips, or text tips) discussed in this description or any combination thereof.

A transmitter can transmit radio signals carrying data and a receiver can receive radio signals carrying data. A transceiver with that transmitter and receiver can include one or more antennas and can be referred to as a "radio transceiver," an "RF transceiver," or a "wireless transceiver." The radio signals transmitted or received by a radio transceiver can be arranged in accordance with one or more wireless communication standards or protocols such as an IEEE 802.15.1 standard for WPANs, a Bluetooth version 4.1 standard developed by the Bluetooth Special Interest Group (SIG) of Kirkland, Washington, or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the communication network 8. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a transceiver can include a destination identifier or address of a system component to which the data is to be transmitted. The data transmitted by a transceiver can include a source identifier or address of the system component including the transceiver. The source identifier or address can be used to send a response to the system component that includes the transceiver that sent the data.

The network communications interface 24 can include a modem, a network interface card, and/or a chip mountable on a circuit board. As an example the chip can comprise a CC3100 Wi-Fi® network processor available from Texas Instruments, Dallas, Texas, a CC256MODx Bluetooth® Host Controller Interface (HCI) module available from Texas instruments, and/or a different chip for communicating via Wi-Fi®, Bluetooth® or another communication protocol.

Figure 3:
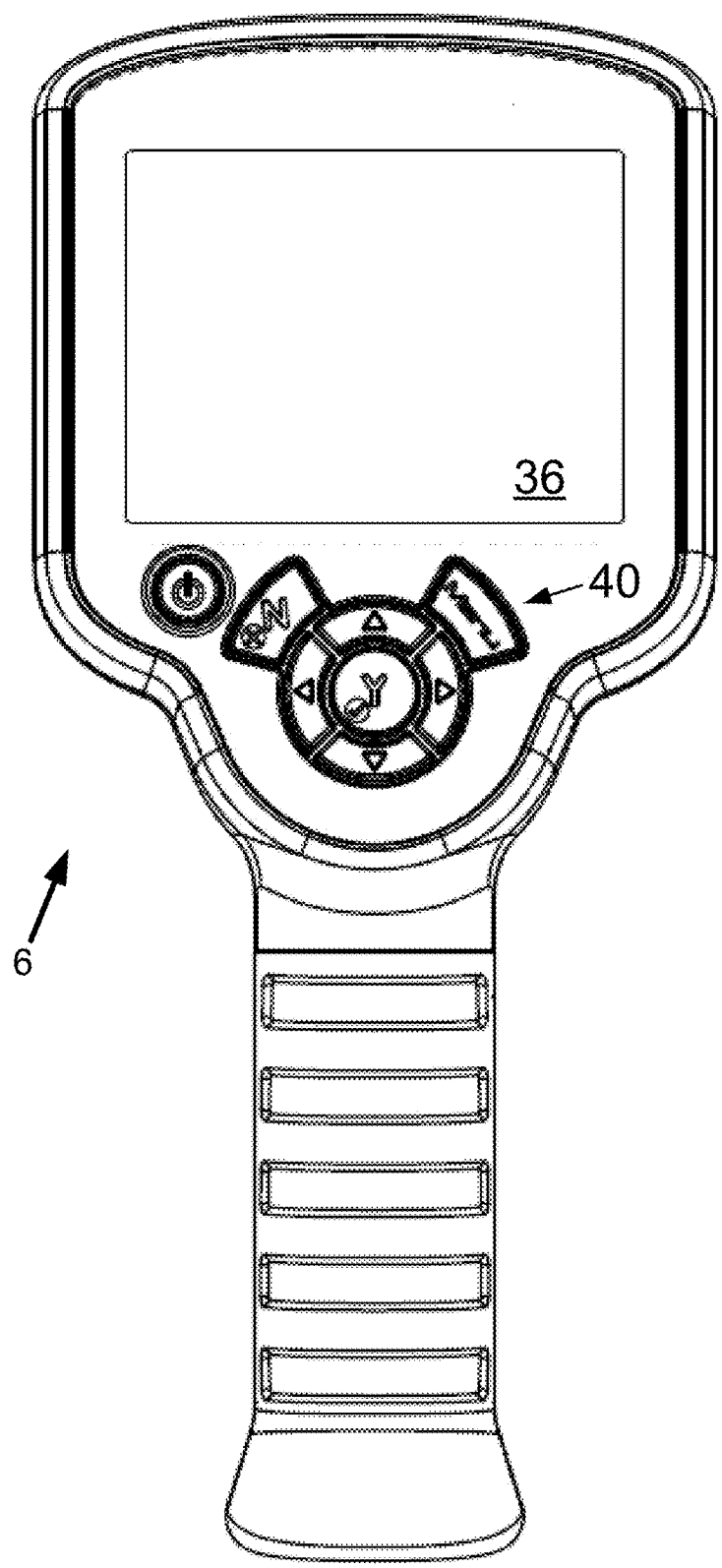
FIG. 3 is a rear view of a thermal imaging device.
Figure 4:
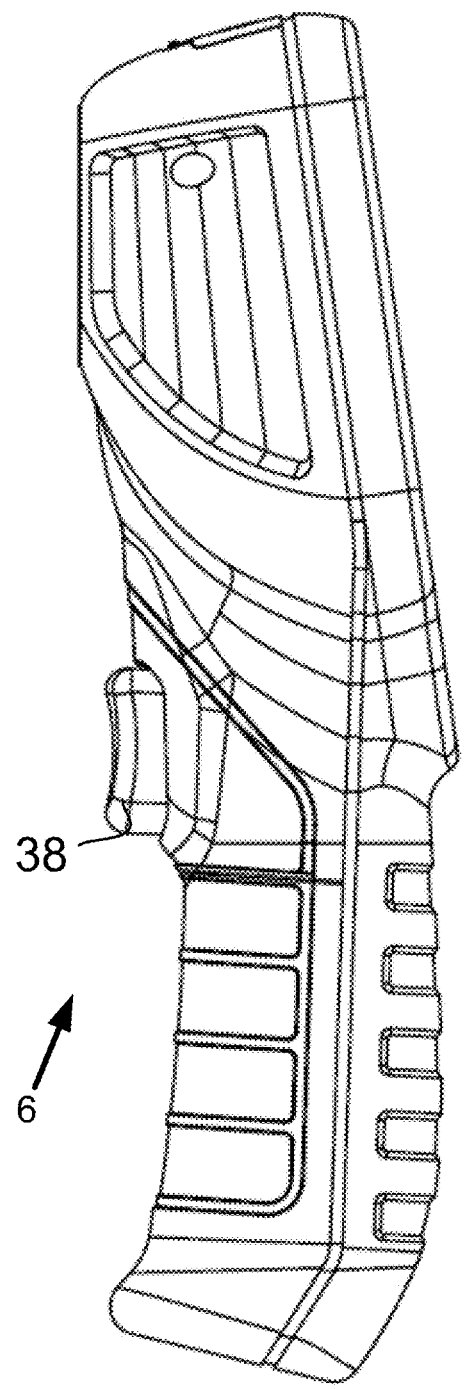
FIG. 4 is a side view of a thermal imaging device.
Figure 5:
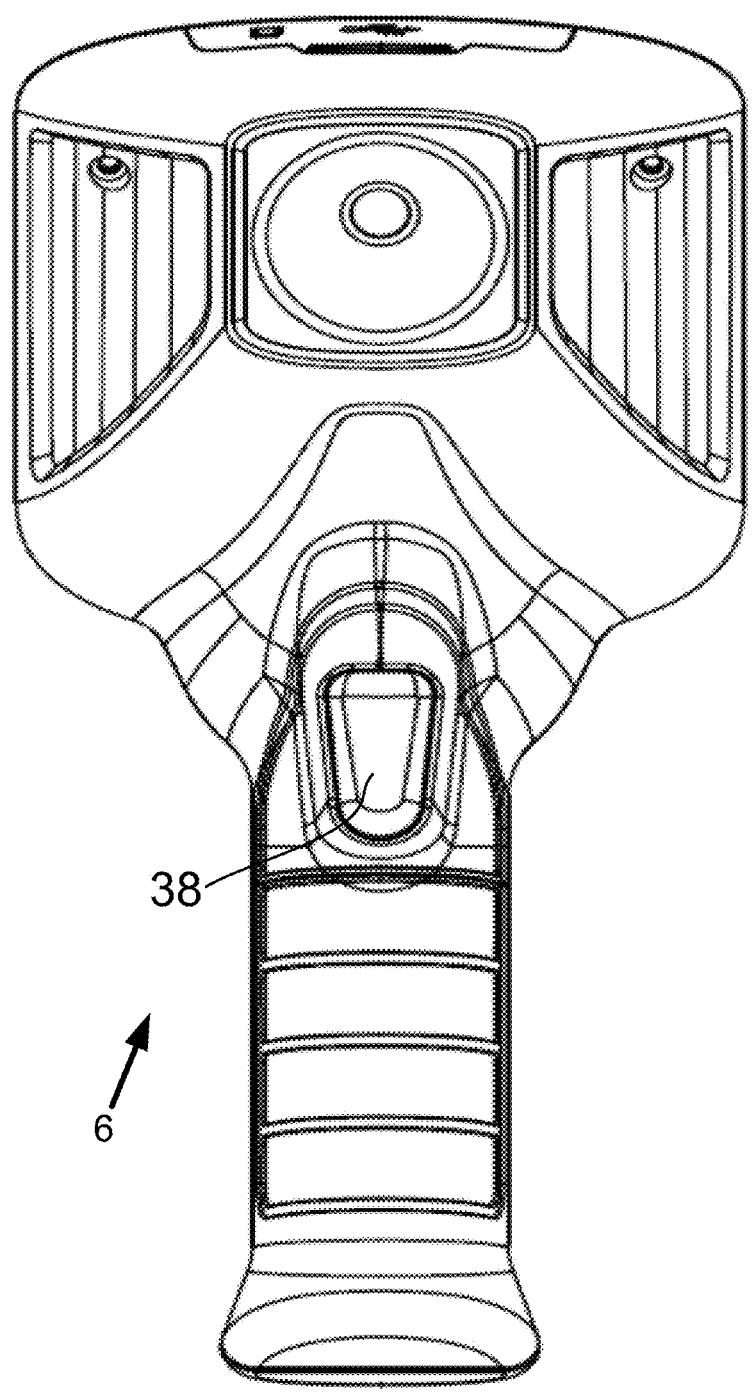
FIG. 5 is a front view of a thermal imaging device.

FIG. 3 depicts a rear view of the TID 6. FIG. 4 depicts a side view of the TID 6. FIG. 5 depicts a front view of the TID 6.

III. Example Operation

Figure 6:
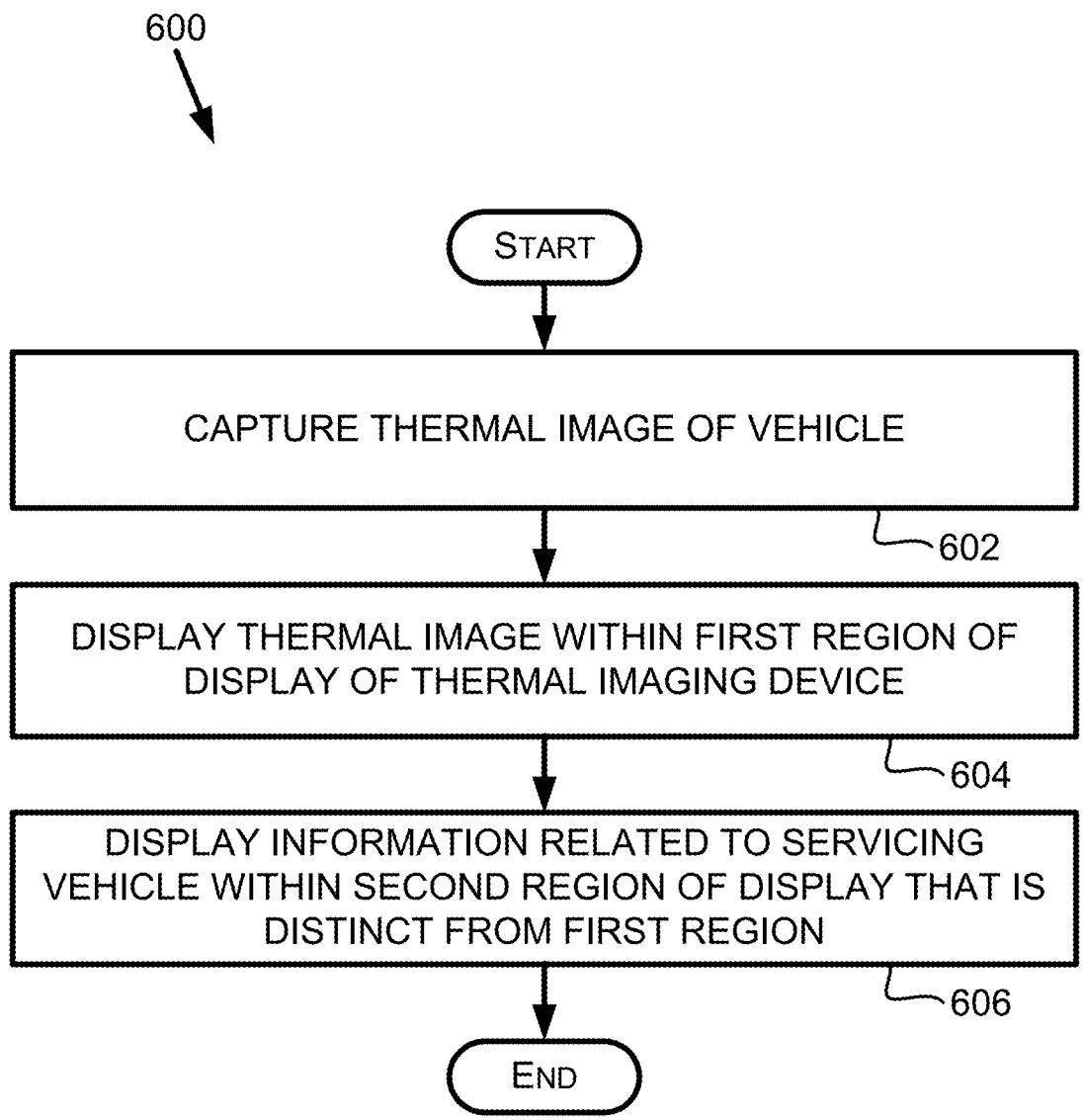
FIG. 6 is a flow chart depicting an example method.

FIG. 6 is a flowchart depicting a method 600 that can be carried out in accordance with one or more example embodiments described herein. The method 600 includes the functions shown in blocks 602, 604, and 606. A variety of methods can be performed using one or more of the functions shown in the method 600 and one or more other functions described herein. Reference numbers included within the description of FIG. 6 are provided as examples, rather than to limit the description to only the particular configuration(s) including the components associated with the reference numbers.

The method 600 may be performed by a thermal imaging device, such as the TID 6.

At block 602, the method 600 includes capturing a thermal image of a vehicle. For example, the camera 30 of the TID 6 may capture a thermal image of the vehicle 4 or a particular component of the vehicle 4. The camera 30 may include a thermal imaging sensor that is configured to detect infrared (or near infrared) wavelengths emitted by the vehicle 4. Higher temperatures of the vehicle 4 may be represented by shorter wavelengths being captured by the camera 30 and lower temperatures of the vehicle 4 may be represented by longer wavelengths being captured by the camera 30. A user may point an imaging aperture of the TID 6 toward a portion of the vehicle 4 and capture a thermal image of that portion of the vehicle 4.

In some examples, image and/or video capture may occur in response to user input. For example, the user interface 26 may include an image trigger 38. The TID 6 may detect that the image trigger 38 is being squeezed and capture the thermal image in response to detecting the trigger squeeze. Further, the TID 6 may capture thermal video frames continuously as long as the TID 6 determines that the image trigger 38 is being squeezed. For example, thermal image capture may commence upon the squeezing of the image trigger 38 and thermal image capture may cease or pause upon the release of the image trigger 38.

In some examples, the TID 6 may send the captured image to the SCS 10 so that the SCS 10 may store the captured image in an image database. The image database stored by the SCS 10 may be built via "crowdsourcing," that is, by receiving images of various vehicle components in various states of operation from thermal imaging devices operated by different users. For example a first user may operate a first thermal imaging device to capture a first thermal image of a malfunctioning heat vent of a 2008 Toyota Corolla. The first user may then operate the first thermal imaging device to send the first thermal image to the SCS 10, along with information indicating that the first thermal image corresponds to a malfunctioning heat vent of a 2008 Toyota Corolla.

As another example, a second user may operate a second thermal imaging device to capture a second thermal image of a normally functioning seat warmer of a 2009 Honda Accord. The second user may then operate the second thermal imaging device to send the second thermal image to the SCS 10, along with information indicating that the second thermal image corresponds to a normally functioning seat warmer of a 2009 Honda Accord. The SCS 10 may then store the first thermal image and the second thermal image along with metadata indicating the aforementioned characteristics of each respective thermal image. This may allow the database to be searched by other users to find thermal images that are relevant to their own malfunctioning vehicle components.

At block 604, the method 600 includes displaying the thermal image within a first region of a display of the thermal imaging device. This may be implemented in various ways. A user may provide input via user interface 26 to select a template from display mapping data 46, and the thermal image may be displayed according to the selected template.

Figure 7:
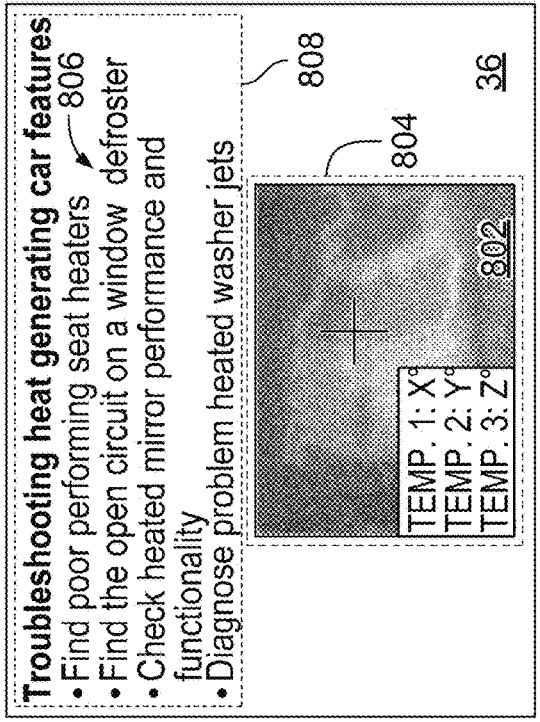
FIG. 7 depicts a display of a thermal imaging device.
Figure 8:
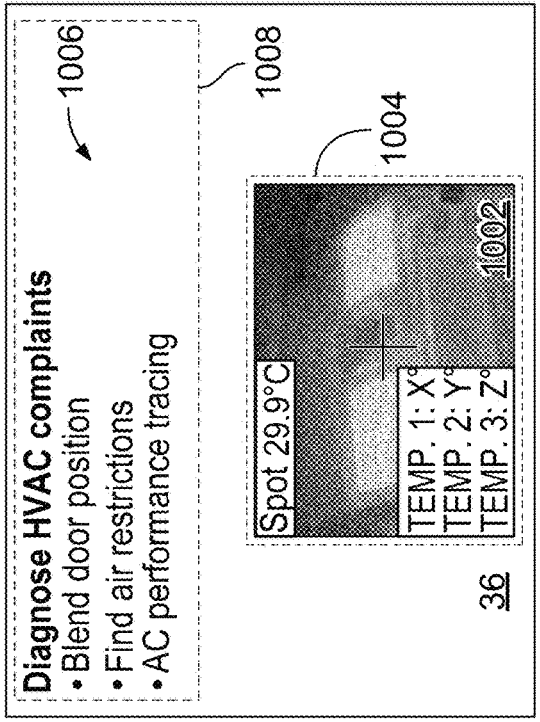
FIG. 8 depicts a display of a thermal imaging device.
Figure 9:
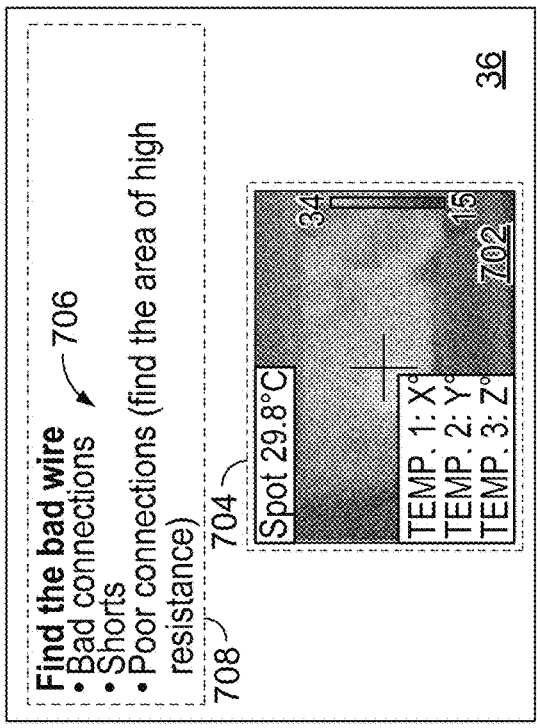
FIG. 9 depicts a display of a thermal imaging device.
Figure 10:
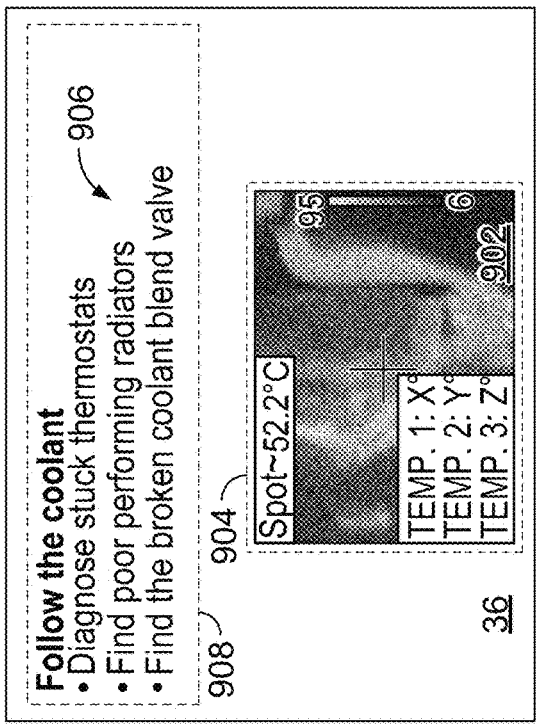
FIG. 10 depicts a display of a thermal imaging device.
Figure 11:
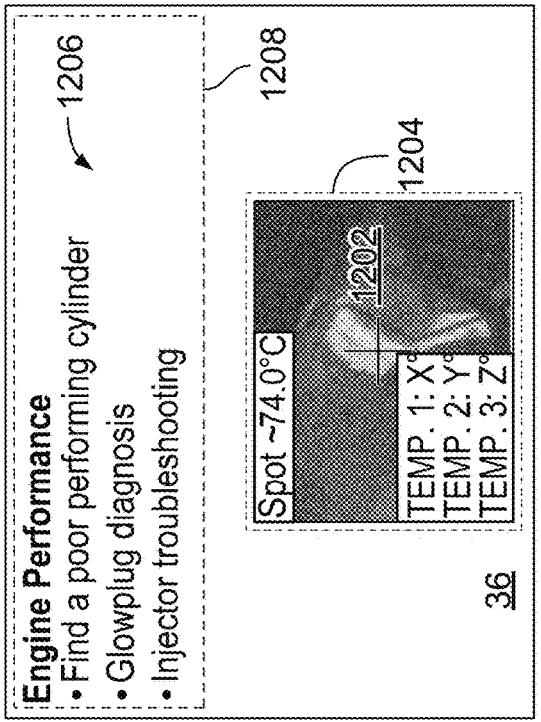
FIG. 11 depicts a display of a thermal imaging device.
Figure 12:
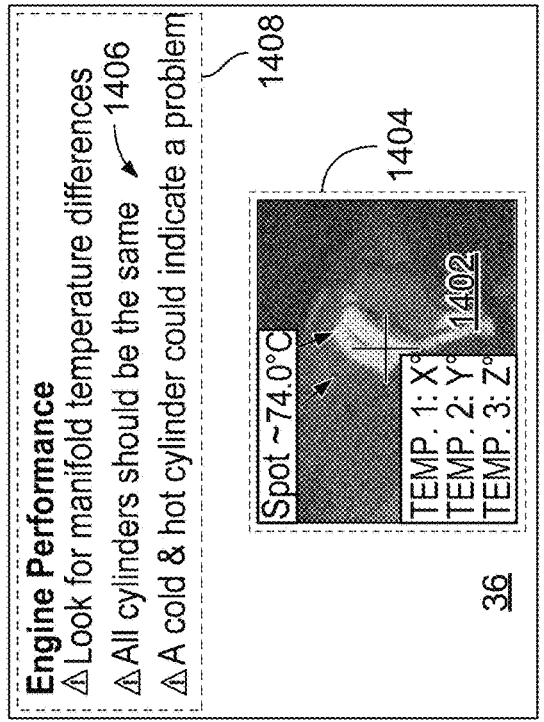
FIG. 12 depicts a display of a thermal imaging device.
Figure 13:
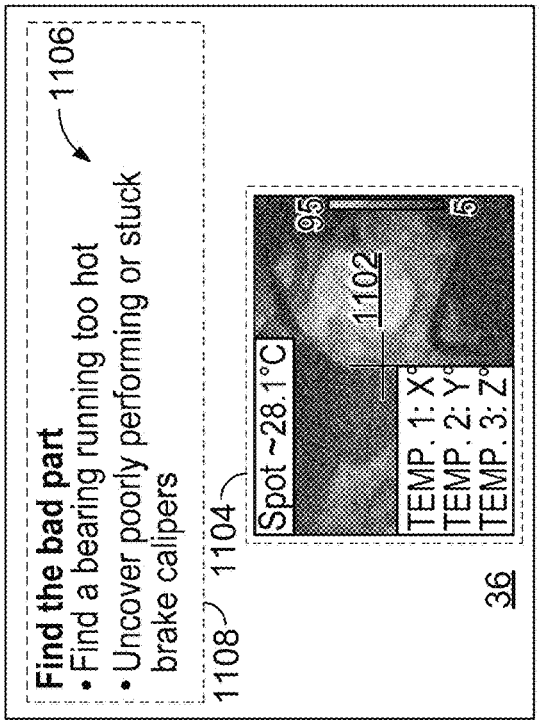
FIG. 13 depicts a display of a thermal imaging device.
Figure 14:
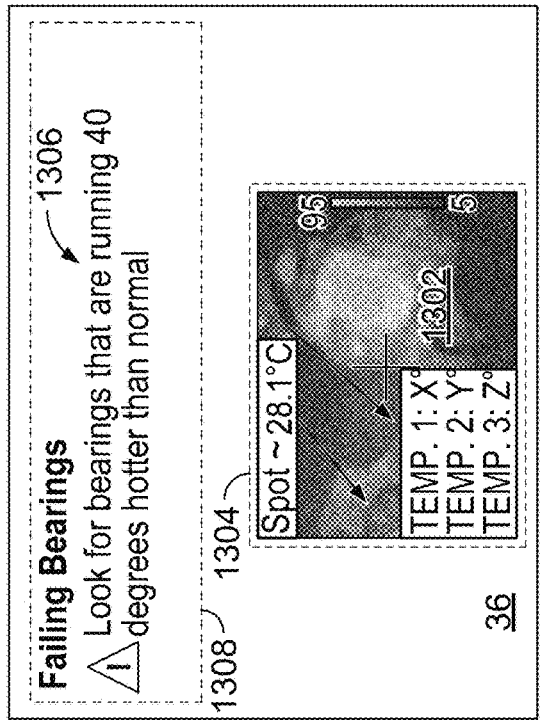
FIG. 14 depicts a display of a thermal imaging device.

For example, FIG. 7 depicts display 36 displaying a captured thermal image 702 within a region 704 of the display 36. FIG. 8 depicts display 36 displaying a captured thermal image 802 within a region 804 of the display 36. FIG. 9 depicts display 36 displaying a captured thermal image 902 within a region 904 of the display 36. FIG. 10 depicts display 36 displaying a captured thermal image 1002 within a region 1004 of the display 36. FIG. 11 depicts display 36 displaying a captured thermal image 1102 within a region 1104 of the display 36. FIG. 12 depicts display 36 displaying a captured thermal image 1202 within a region 1204 of the display 36. FIG. 13 depicts display 36 displaying a captured thermal image 1302 within a region 1304 of the display 36. FIG. 14 depicts display 36 displaying a captured thermal image 1402 within a region 1404 of the display 36.

At block 606, the method 600 includes displaying information related to servicing the vehicle within a second region of the display that is distinct from the first region. The information may include textual suggestions for repairing the vehicle 4 or a component of the vehicle 4, for example. The displayed information may be stored by the SCS 10 and sent to the TID 6, or the displayed information may be stored on the computer-readable medium 28 and accessed locally by the TID 6.

For instance, FIG. 7 depicts display 36 displaying information 706 within a region 708 of the display 36. FIG. 8 depicts display 36 displaying information 806 within a region 808 of the display 36. FIG. 9 depicts display 36 displaying information 906 within a region 908 of the display 36. FIG. 10 depicts display 36 displaying information 1006 within a region 1008 of the display 36. FIG. 11 depicts display 36 displaying information 1106 within a region 1108 of the display 36. FIG. 12 depicts display 36 displaying information 1206 within a region 1208 of the display 36. FIG. 13 depicts display 36 displaying information 1306 within a region 1308 of the display 36. FIG. 14 depicts display 36 displaying information 1406 within a region 1408 of the display 36.

In some examples, the user interface 26 may receive input representing a selection of a vehicle component. In response, the TID 6 may identify information that is associated with the selected vehicle component. In this context, the displayed information may include the information identified by the input. For example, the input may indicate a selection of a seat warmer, and the display 36 may display the information 806 in the region 808. In another example, the information 806 might read "look for a hot spot or a cold spot on the seat warmer." In another example, the input may indicate a selection of a window defroster, and the information 806 might read "find a cold spot indicating an open circuit in the defroster." Other examples are possible. The identified information may be retrieved from a database accessible by the SCS 10 or the TID 6, for example. That is, the identified information may be stored by the SCS 10 and sent to the TID 6, or the identified information may be stored on the computer-readable medium 28 and accessed locally by the TID 6.

In some examples, the information 806 might take the form of a thermal image of a normally functioning example of the identified vehicle component. For diagnostic purposes, a user may be able to compare the captured image 802 with an image that corresponds with the normally functioning component. In addition or alternatively, the information 806 might take the form of a thermal image of a malfunctioning example of the identified vehicle component. For diagnostic purposes, a user may be able to compare the captured image 802 with an image that corresponds with the malfunctioning component.

In another example, the received input may indicate a particular symptom of the vehicle component and the identified information may be related to the symptom. For example the input received via the user interface 26 may indicate a malfunctioning window defroster of the vehicle 4 and the information 806 may include "find a cold spot indicating an open circuit in the defroster." In another example, the received input may indicate failing bearings, and the information 1306 may include "Look for bearing that are running 40 degrees hotter than normal."

In other instances, the displayed information may be relevant to a particular make, model, and/or year of a vehicle. For example, the input received via the user interface 26 may indicate a make, a model, or a year of the vehicle 4, and the information 806 may be particularly related to the indicated make, the model, or the year of the vehicle 4.

Figure 15:
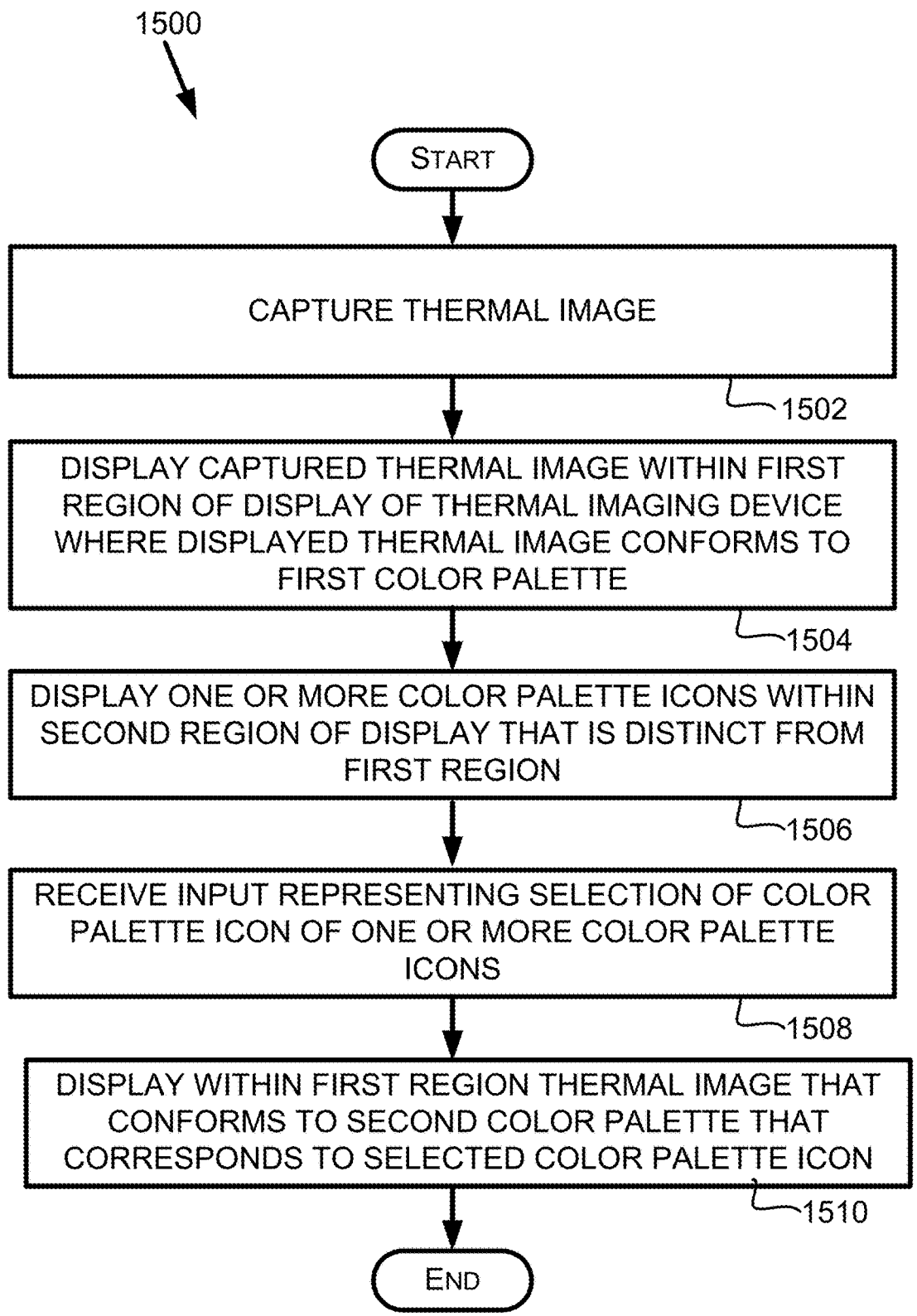
FIG. 15 is a flow chart depicting an example method.

FIG. 15 is a flowchart depicting a method 1500 that can be carried out in accordance with one or more example embodiments described herein. The method 1500 includes the functions shown in blocks 1502, 1504, 1506, 1508, and 1510. A variety of methods can be performed using one or more of the functions shown in the method 1500 and one or more other functions described herein. Reference numbers included within the description of FIG. 15 are provided as examples, rather than to limit the description to only the particular configuration(s) including the components associated with the reference numbers.

The method 1500 may be performed by a thermal imaging device, such as the TID 6.

Figure 16:
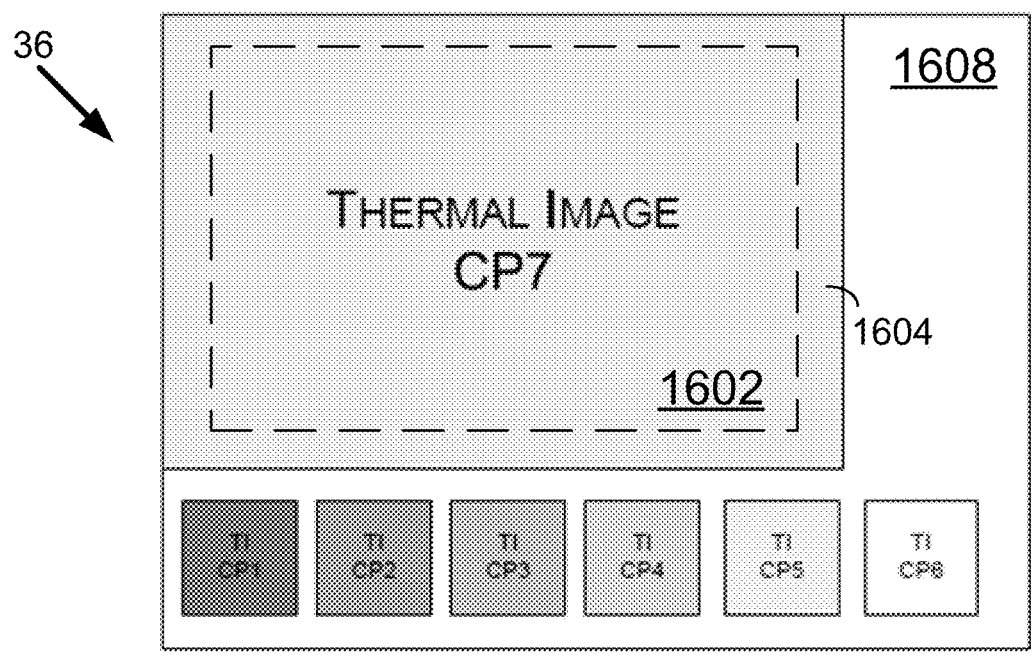
FIG. 16 depicts a display of a thermal imaging device.

At block 1502, the method 1500 includes capturing a thermal image. Block 1502 may be performed similarly to block 602, for example. Referring to FIG. 16, the TID 6 may capture the image 1602, for example.

At block 1504, the method 1500 includes displaying the captured thermal image within a first region of a display of the thermal imaging device. Block 1504 may be performed similarly to block 604, for example. The displayed thermal image conforms to a first color palette that maps temperatures (e.g., wavelengths) to a color or a brightness level.

For example, the captured image 1602 may be displayed in the region 1604 according to a color palette #7 ("CP7"). CP7 might map various temperatures (represented by various infrared wavelengths) to various colors and/or levels of brightness. CP7 might display various temperatures as various shades of orange, for example, with higher temperatures corresponding to brighter (yellowish) orange and lower temperatures corresponding to darker (reddish) orange. Other examples are possible.

At block 1506, the method 1500 includes displaying one or more color palette icons within a second region of the display that is distinct from the first region. The one or more color palette icons respectively represent additional color palettes that map temperatures (e.g., wavelengths) to a color or a brightness level.

For example, the color palette icons CP1, CP2, CP3, CP4, CP5 and CP6 may be displayed within the region 1608 of the display 36. The color palette icons CP1, CP2, CP3, CP4, CP5 and CP6 may each represent a unique mapping of temperature (e.g., wavelength) to color and/or brightness.

At block 1508, the method 1500 includes receiving input representing a selection of a color palette icon of the one or more color palette icons. For example, the display 36 may be a touchscreen that receives a touch and drag input of color palette icon CP2 that drags the color palette icon CP2 from the region 1608 into the region 1604. In other examples, the input representing a selection of the color palette CP2 may take other forms as well (e.g., a double click, a double tap, or a single tap, etc.).

Figure 17:
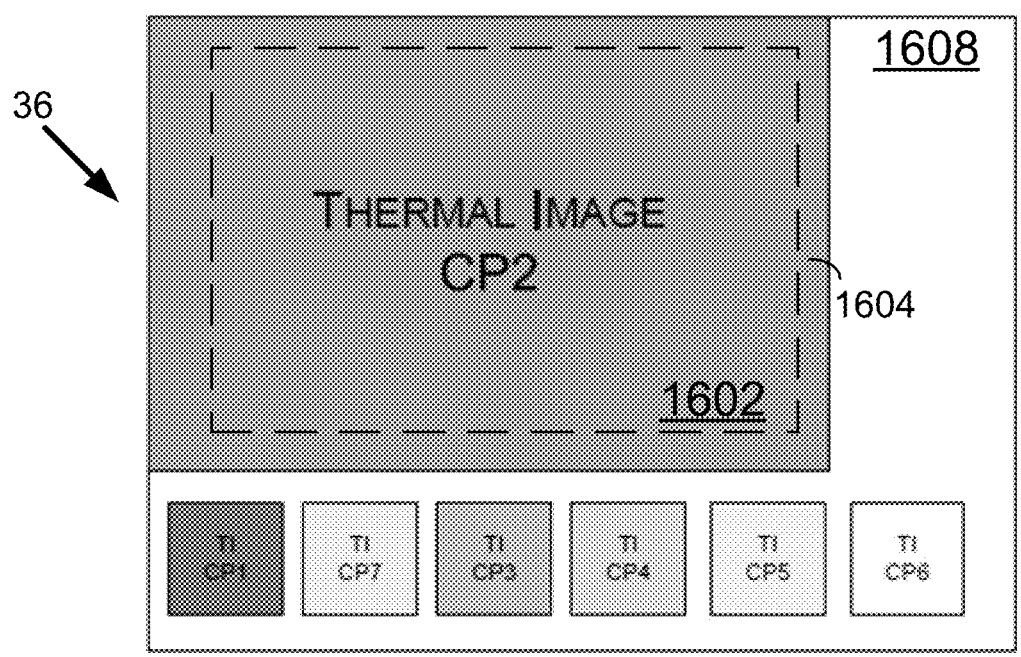
FIG. 17 depicts a display of a thermal imaging device.

At block 1510, the method 1500 includes displaying, within the first region, a thermal image that conforms to a second color palette that corresponds to the selected color palette icon. The display 36 may responsively cause the captured thermal image 1602 to be displayed (e.g., modified) in accordance with a color map that corresponds to the color palette icon CP2, as shown in FIG. 17.

Additionally, the selected color palette icon CP2 may be replaced in the region 1608 with a color palette icon CP7. The color palette icon CP7 may take the form of a compressed version of the thermal image 1602 that conforms to the color palette CP7.

Figure 18:
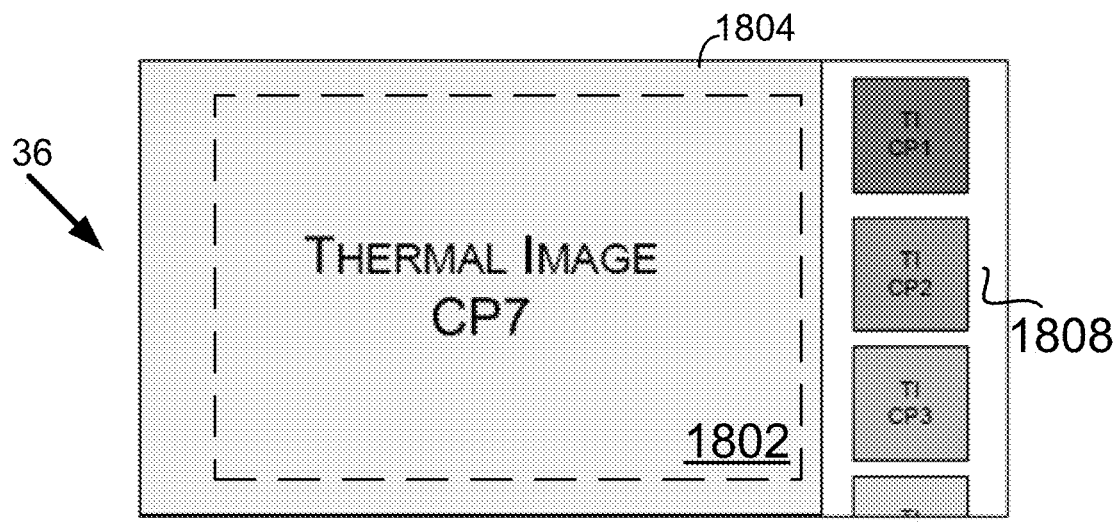
FIG. 18 depicts a display of a thermal imaging device.
Figure 19:
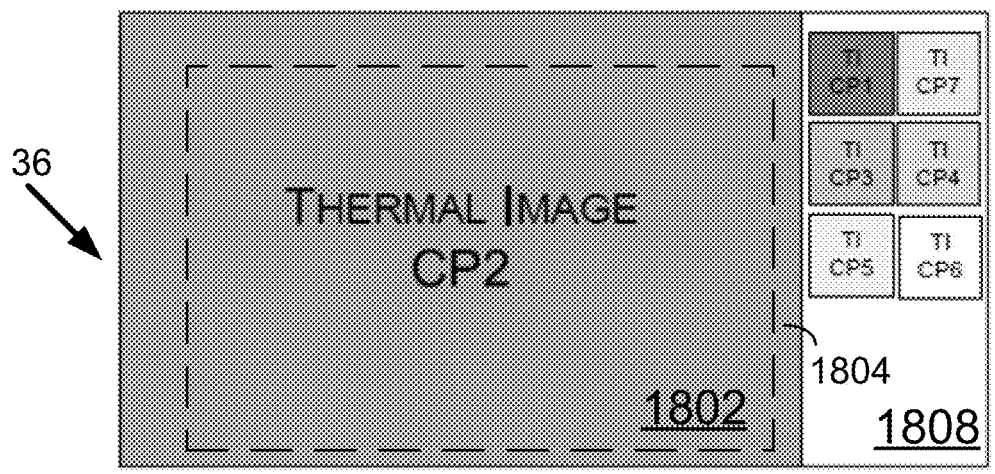
FIG. 19 depicts a display of a thermal imaging device.

Respective regions for displaying full-size thermal images and color palette icons may be arranged in different ways as well. See thermal image 1802, region 1804, color palette icons CP1, CP2, and CP3, and region 1808 of FIG. 18, for example. See also thermal image 1802, regions 1804 and 1808, and color palette icons CP1, CP3, CP5, CP7, CP4, and CP6 of FIG. 19, for example.

Figure 20:
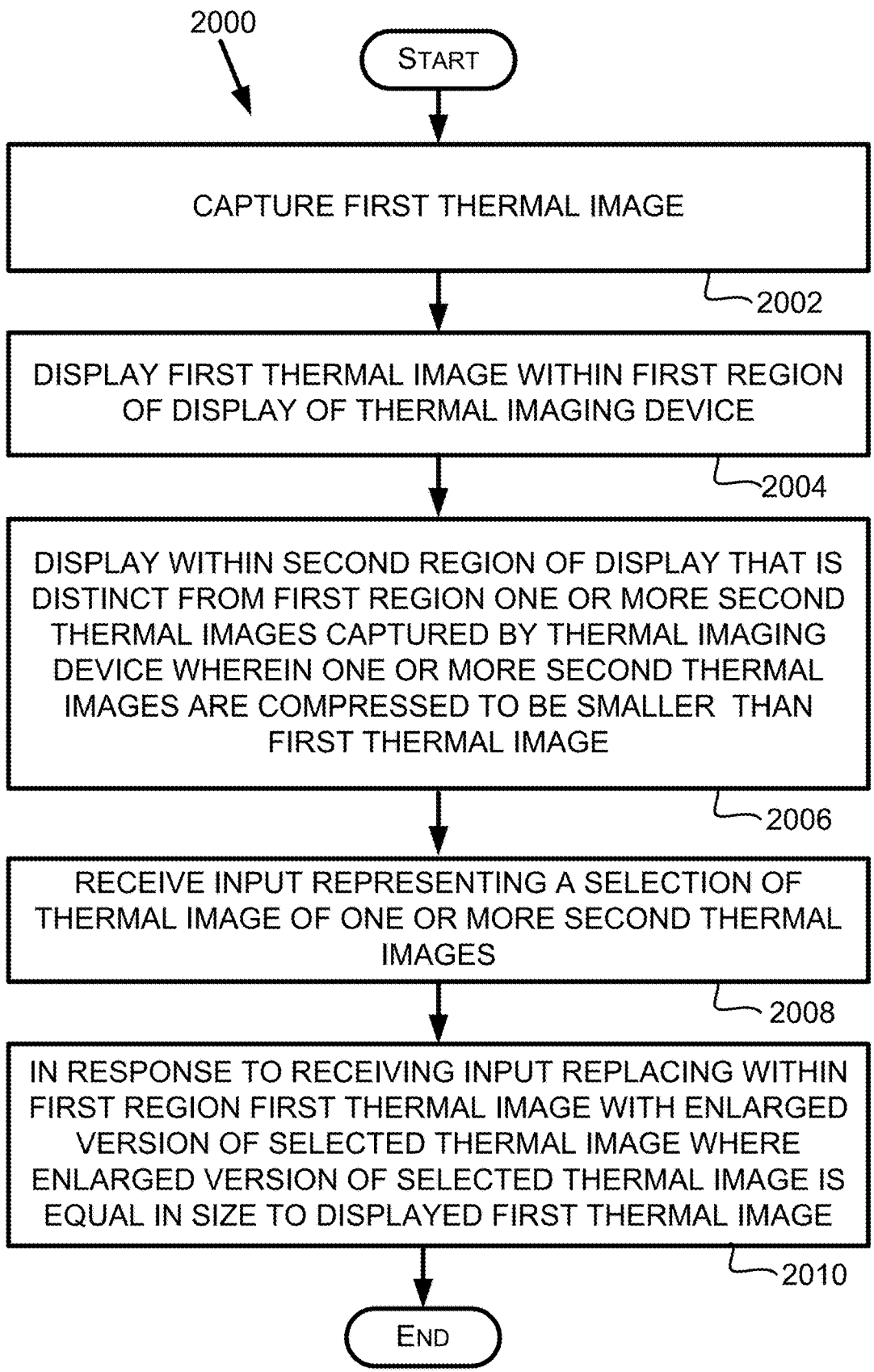
FIG. 20 is a flow chart depicting an example method.

FIG. 20 is a flowchart depicting a method 2000 that can be carried out in accordance with one or more example embodiments described herein. The method 2000 includes the functions shown in blocks 2002, 2004, 2006, 2008, and 2010. A variety of methods can be performed using one or more of the functions shown in the method 2000 and one or more other functions described herein. Reference numbers included within the description of FIG. 20 are provided as examples, rather than to limit the description to only the particular configuration(s) including the components associated with the reference numbers.

The method 2000 may be performed by a thermal imaging device, such as the TID 6.

Figure 21:
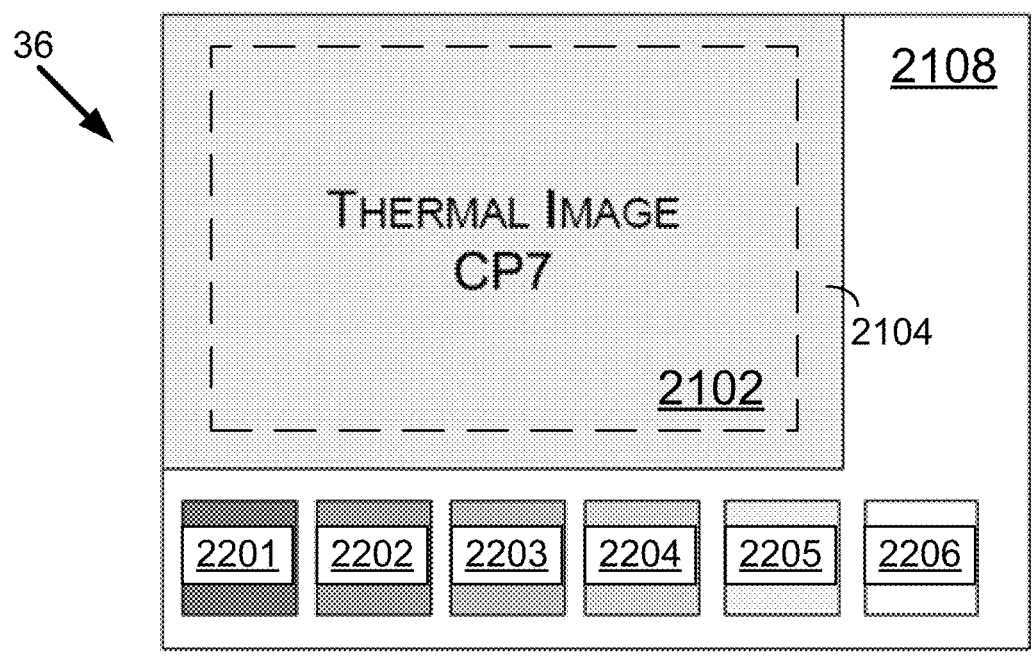
FIG. 21 depicts a display of a thermal imaging device.

At block 2002, the method 2000 includes capturing a first thermal image. Block 2002 may be performed similarly to block 602 or block 1502, for example. Referring to FIG. 21, the TID 6 may capture the image 2102.

At block 2004, the method 2000 includes displaying the first thermal image within a first region of a display of the thermal imaging device. Block 2004 may be performed similarly to block 604 or block 1504, for example. Referring to FIG. 21, the display 36 may display the captured image 2102 in the region 2104. The image 2102 may conform to a color palette CP7.

At block 2006, the method 2000 includes displaying, within a second region of the display that is distinct from the first region, one or more second thermal images captured by the thermal imaging device. The one or more second thermal images may be compressed to be smaller than the first thermal image.

For example, the display 36 may display, within the region 2108, compressed thermal images 2201, 2202, 2203, 2204, 2205, and 2206. As shown, the thermal images 2201-2206 are compressed to be smaller than the thermal image 2102.

At block 2008, the method 2000 includes receiving input representing a selection of a thermal image of the one or more second thermal images. For example, the display 36 may be a touchscreen that receives a touch and drag input of the thermal image 2202 that drags the thermal image 2202 from the region 2108 into the region 2104. Other forms of such input are possible (e.g., a double click, a double tap, or a single tap of the image 2202, etc.).

Figure 22:
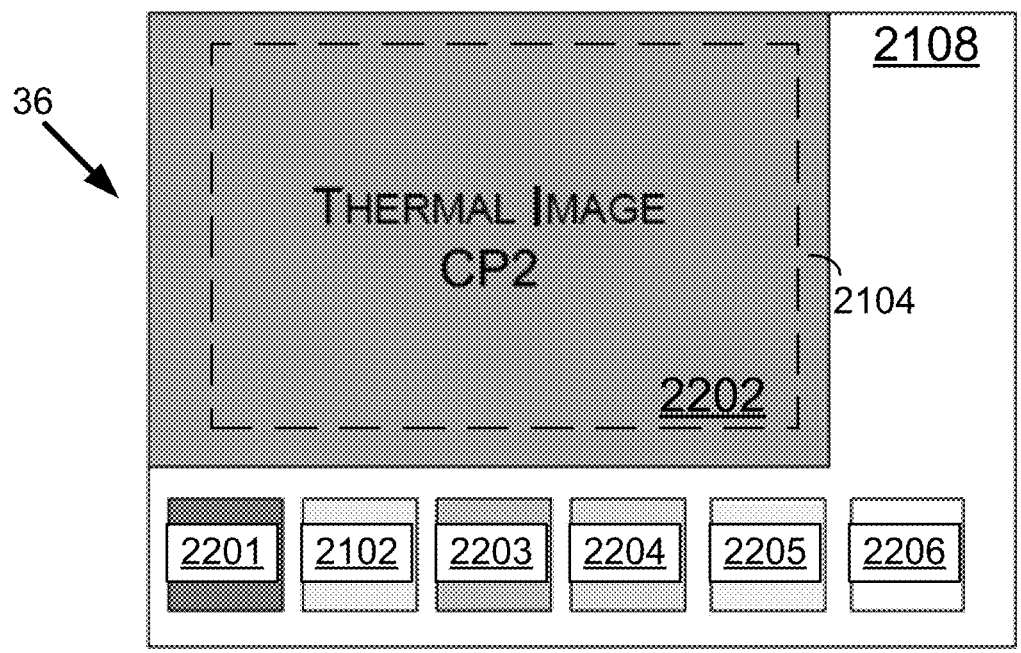
FIG. 22 depicts a display of a thermal imaging device.

At block 2010, the method 2000 includes, in response to receiving the input, replacing, within the first region of the display, the first thermal image with an enlarged version of the selected thermal image. In this context, the enlarged version of the selected thermal image is equal in size to the displayed first thermal image. For example, the display 36 may, in response to receiving the input, replace the image 2102 with the image 2202 within the region 2104. As shown in FIG. 22, the image 2202 has been enlarged to be equal in size to the image 2102. In addition, the display 36 may replace, within the region 2108, the selected thermal image 2202 with a compressed version of the thermal image 2102, as shown in FIG. 22.

FIGS. 23-34 show additional aspects of the TID 6. The aspects shown in FIGS. 23-34 include screen shots of captured images, menus, etc. that can be displayed on a display (e.g., the display 36) of the TID 6. The processor 22 can execute the computer-readable program instructions (e.g., the CRPI 42) to generate the displays shown in the example screen shots of FIGS. 23-34.

Figure 23:
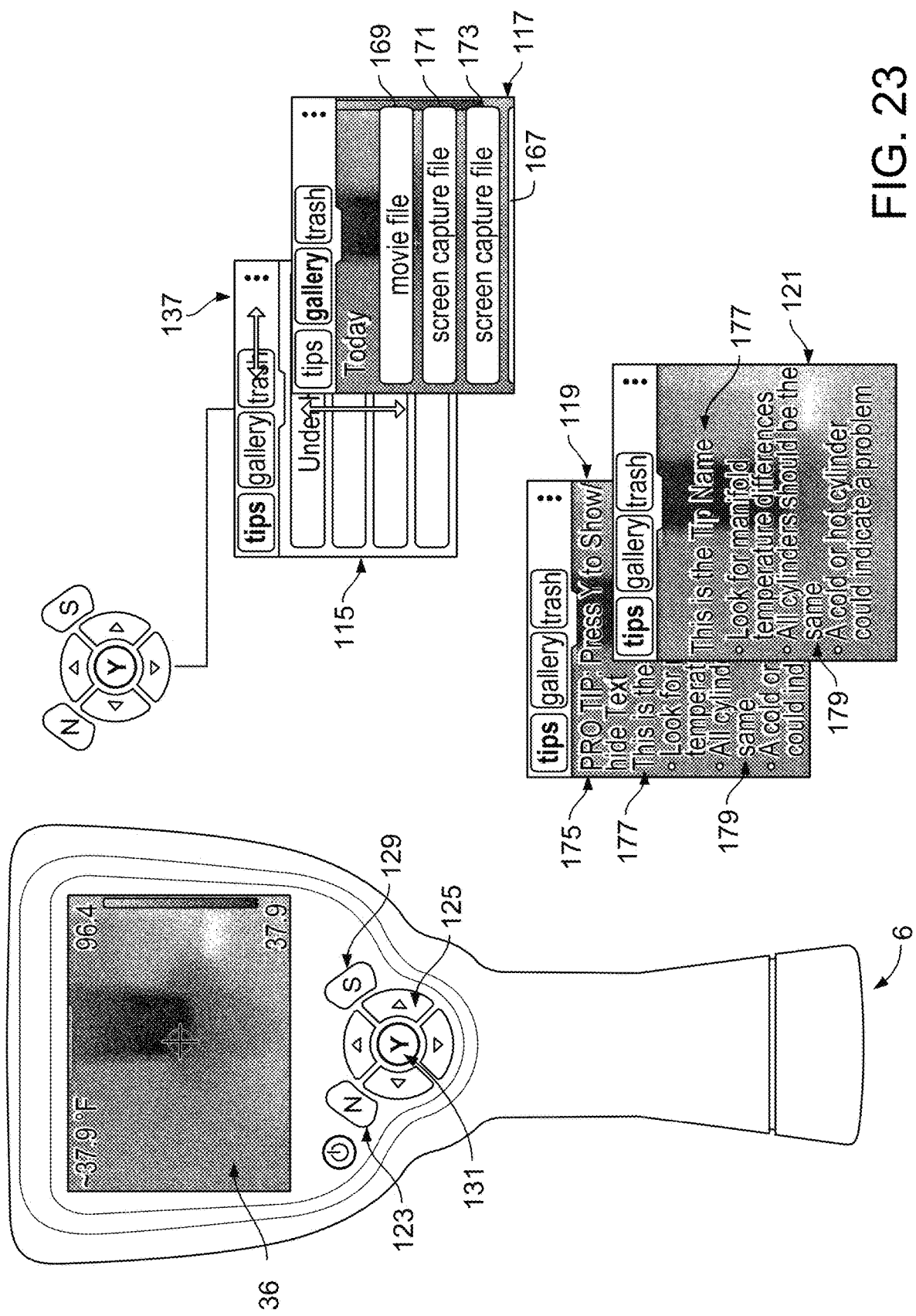
FIG. 23 shows example screenshots displayed by a thermal imaging device.
Figure 24:
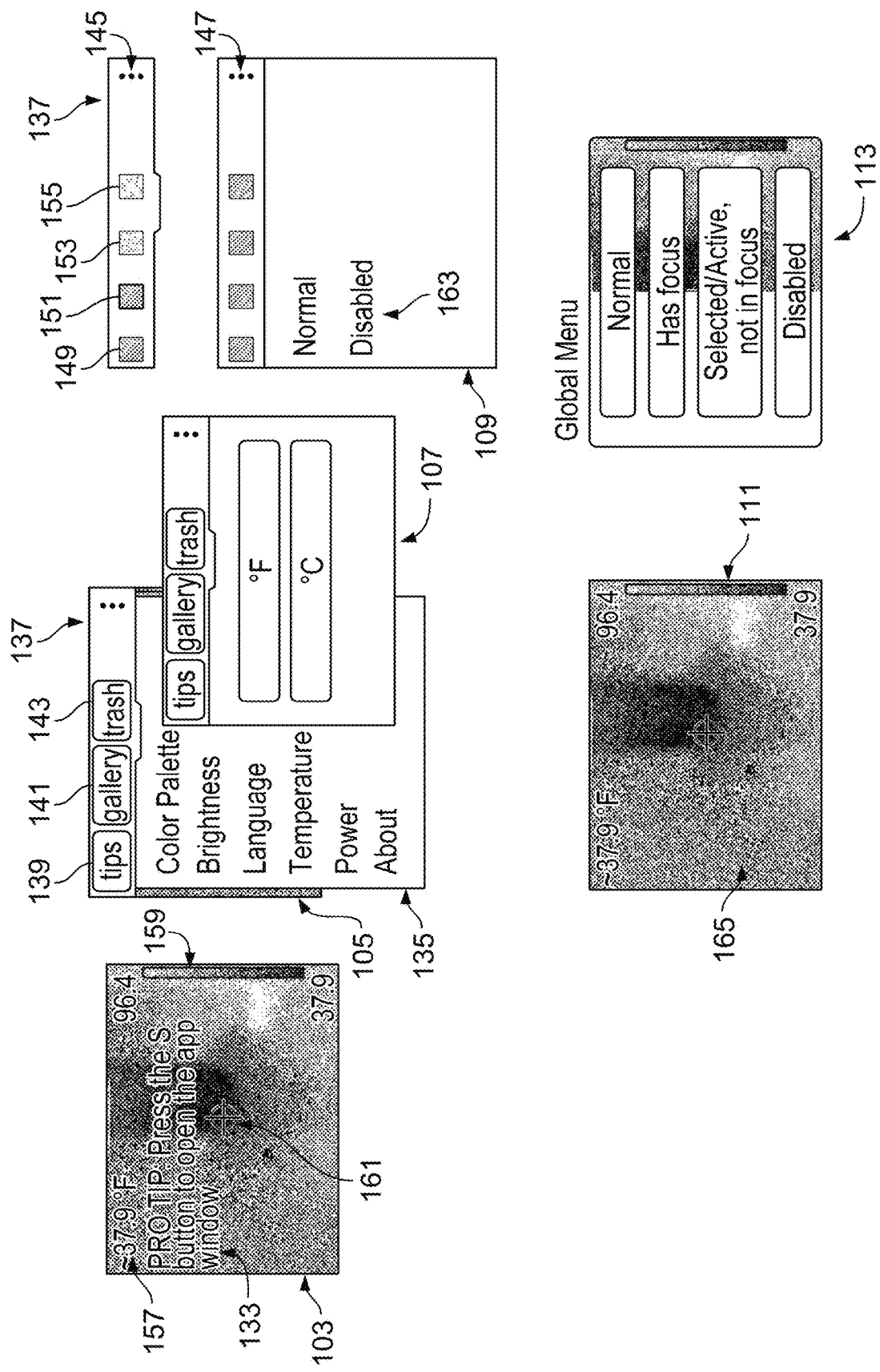
FIG. 24 shows example screenshots displayed by a thermal imaging device.

FIG. 23 and FIG. 24 show an overview of the TID 6 and screen shots 103, 105, 107, 109, 111, 113, 115, 117, 119, and 121 (or more simply screen shots 103 to 121) that are displayable on the display 36. The processor 22 can output displayable aspects shown in the screen shots 103 to 121 to the display 36. The TID 6 includes an N-button 123, a directional pad (D-pad) 125, an S-button 129, and a Y-button 131. The S-button 129 can be labeled as "Menu" or with a different indicator. The D-pad 125 includes an up key, a down key, a left key, and a right key. The left and right keys can be used to move focus across the menu tool bar 137 as shown in the screen shot 115. The up and down keys can be used to move focus through elements within the display 36 below the tool bar menu 137 as shown in screen shot 115. A "button" can be referred to as a "key" as in a key of a keypad or keyboard 40. A "key" can be referred to as a "button."

The screen shot 103 includes several displayable aspects. Those displayable aspects include a textual tip 133, a temperature 157, a temperature scale 159, and temperature marker 161. The textual tip 133 states: "PRO TIP: Press the S button to open the app window." Other examples of a textual tip displayable on the display 36 are also possible. The textual tips can help new users with using the TID 6. The temperature 157 can display a temperature at a location indicated by the temperature marker 161.

The screen shot 105 shows a setup menu 135. The setup menu 135 comprises setup up mode selectors for color palette setup, brightness setup, language setup, temperature setup, power setup, and an about selector. The aspects displayed in the screen shot 105 also include the tool bar menu 137, and tool bar selectors 139, 141, 143 for tips, gallery, and trash, respectively.

The screen shot 107 includes a temperature setup screen that provides a user with an option to select temperature units (° F. or ° C.). The temperature setup screen shown in the screen shot 107 can be displayed in response to selecting the temperature setup selector shown in screen shot 105.

The screen shot 109 shows an overflow menu with example selection options Normal and Disabled. Other examples of names of selection options within the overflow menu are also possible. The screen shot 109 shows the tool bar menu 137, additional features selectors 145 and 147, and visual states for buttons 149, 151, 153, and 155 on the tool bar menu 137 based on a status of a selection button. As an example, the visual state for button 149 is normal (e.g., without focus and enabled). As an example, the visual state for button 151 is has focus (e.g., active). As an example, the visual state for button 153 is selected/active but not in focus. As an example, the visual state for button 155 is disabled. The screen shot 109 can include a selection area 163 to make selections to change the visual state of a button.

The screen shot 111 includes displayable aspects including an image 165, such as a live view image. The S-button 129 can be pressed while the live view image 165 is displayed to cause the tool bar menu 137 to appear. The S-button 129 can be pressed when the tool bar menu 137 is displayed to cause the tool bar menu 137 to disappear and the live view image 165 to be displayed. Camera related data can be hidden when an application window is opened.

The screen shot 113 includes displayable aspects of a global menu. Those aspects includes selectors such as Normal, Has Focus, Selected/Active (not in focus), and Disabled. Those aspects can pertain to the tool bar buttons shown in the screen shot 109.

The screen shot 117 shows an example of displaying a partial file selector 167 below the complete file selectors 169 (movie file), 171 (screen capture file), and 173 (screen capture file). The partial file selector 167 can be displayed instead of a scroll bar to provide a hint that other selectors are available. The partial file selector 167 can be selected to cause the partial file selector 167 to be displayed in its entirety.

The screen shot 119 in FIG. 23 shows a usage tip 175 "PRO TIP: Press Y to show/hide text," a tip name 177, and a repair tip 179 "Look for manifold temperature differences, all cylinders should be the same, a cold or hot cylinder could indicate a problem." A usage tip can guide a user how to use the TID 6. A repair tip can guide a user in diagnosing and/or repairing a vehicle. The usage tip can fade away after a predetermined amount of time (e.g., 2 to 3 seconds) and the tip name 177 and the repair tip 179 can move towards the positon at which the usage tip 175 was displayed. The processor 22 may track how many times each usage tip is displayed since a factory reset of TID 6 so that the usage tip is not perceived as being in the way once the user has become familiar with operating the TID 6.

Figure 25:
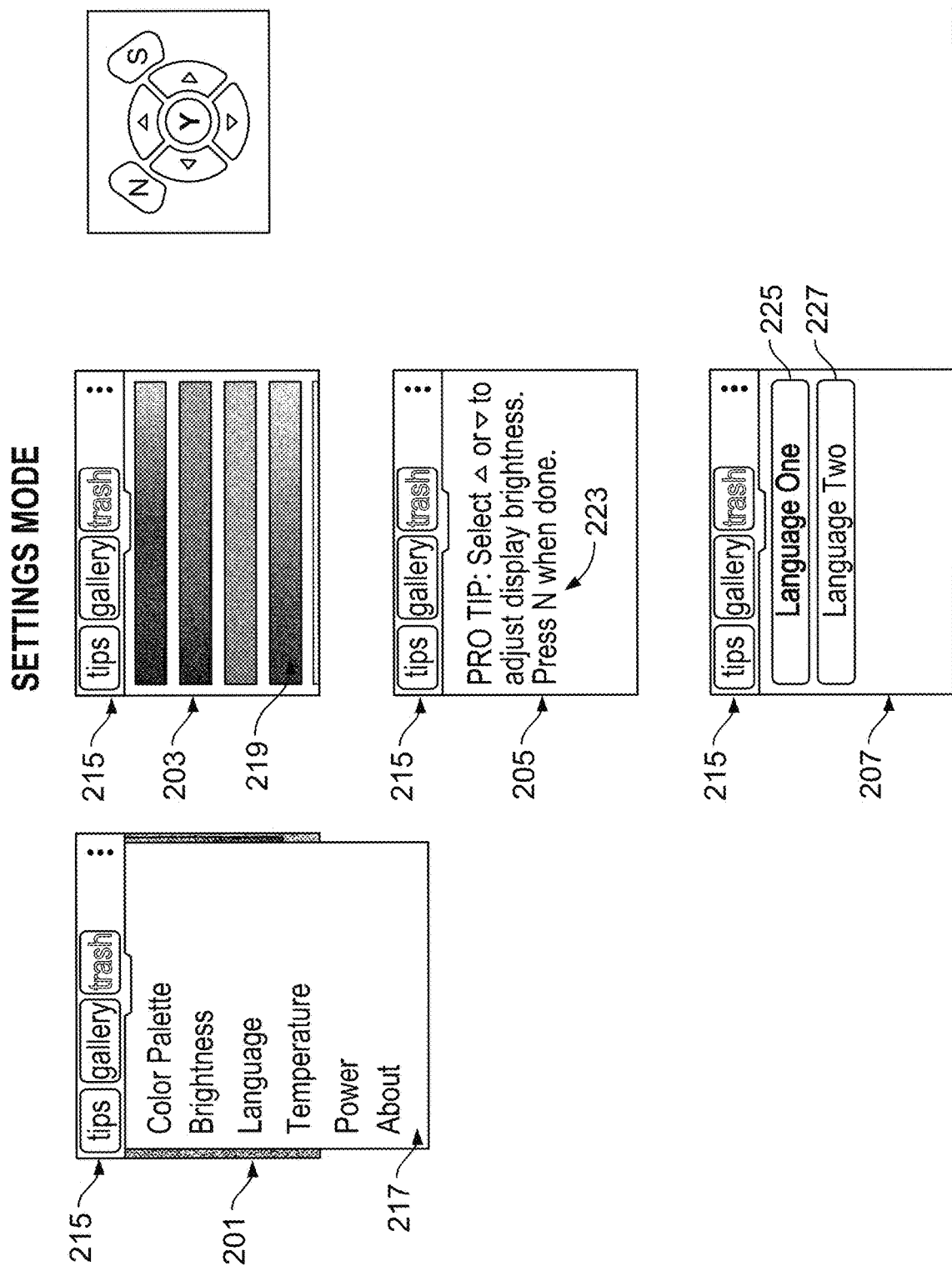
FIG. 25 shows example screenshots displayed by a thermal imaging device.
Figure 26:
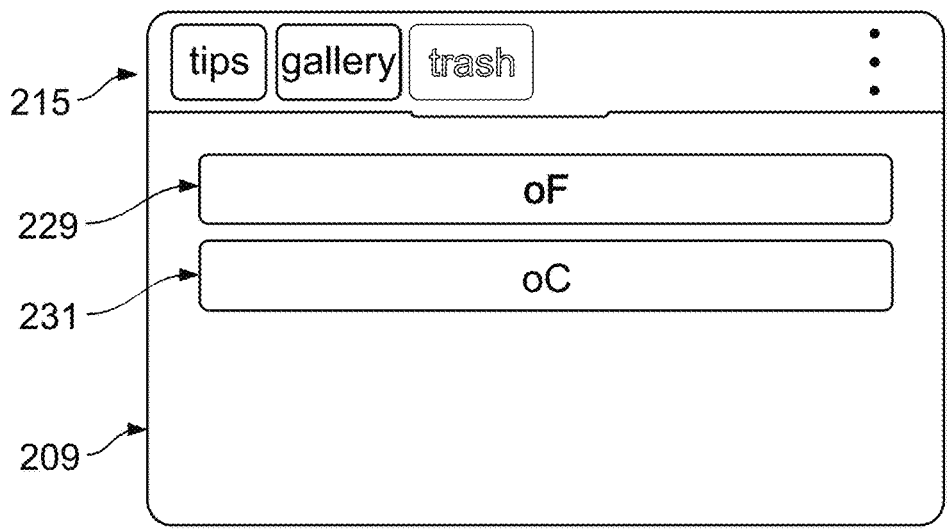
FIG. 26 shows example screenshots displayed by a thermal imaging device.
Figure 26:
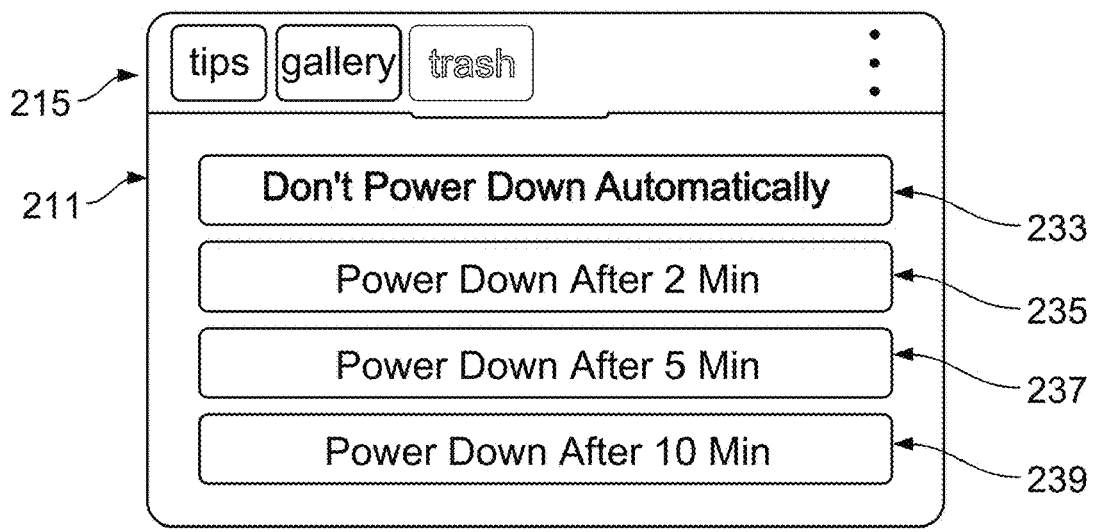
Figure 26:
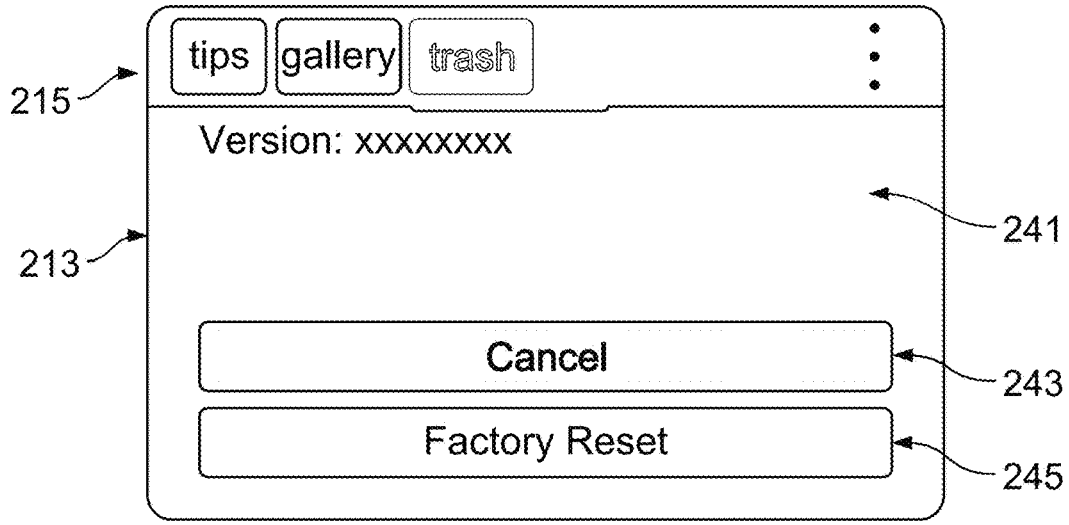

Next, FIG. 25 and FIG. 26 show example screen shots 201, 203, 205, 207, 209, 211, and 213 (or more simply screenshots 201 to 213) that are displayable on the display 36 during a settings mode of the TID 6. The processor 22 can output displayable aspects shown in the screen shots 201 to 213 to the display 36.

The displayable aspects of the screen shot 201 include a tool bar menu 215 (including example tool bar selections:

tips, gallery, and trash) and the settings menu 217 including example setting selections for color palette, brightness, language, temperature, power, and about information.

The aspects of the screen shot 203 can be displayed in response to selecting the Y-key while the color palette selection is in focus (e.g., active) in the settings menu 217. Those aspects of the screen shot 203 include the tool bar menu 215 and a color palette 219. A color for images to be displayed can be selected from the color palette 219. Pressing the Y-key after selecting a color from the color palette can enter the selected color, whereas pressing the N-key can cancel the color selection and/or to return the user to the selection menu 217.

The aspects of the screen shot 205 can be displayed in response to selecting the Y-key while the brightness selection is in focus (e.g., active) in the settings menu 217. Those aspects of the screen shot 205 include the tool bar menu 215 and a brightness selection instruction 223. The brightness selection instruction 223, for example, can state "PRO TIP: Select▲ or ▼ to adjust display brightness. Press N when done." The processor 22 can determine which keyboard selections are entered and adjust a brightness adjustment associated with the display 36. Pressing the keys on the keyboard 40 when making an adjustment can cause the processor 22 to output an audible tone by a speaker or otherwise. The tones output by the processor 22 can get louder or quieter as the adjustment limits are reached.

The aspects of the screen shot 207 can be displayed in response to selecting the Y-key while the language selection is in focus (e.g., active) in the settings menu 217. Those aspects of the screen shot 207 include the tool bar menu 215, a first language selection 225, and a second language selection 227. The processor 22 can determine a selection of the first language selection 225 or the second language selection 227 and subsequently display text (e.g., usage tips, repair tips, and menus) in the selected language.

The aspects of the screen shot 209 shown in FIG. 26 can be displayed in response to selecting the Y-key while the temperature selection is in focus (e.g., active) in the settings menu 217. Those aspects of the screen shot 209 include the tool bar menu 215, a ° F. selection 229, and a ° C. selection 231. The processor 22 can determine a selection of the ° F. selection 229 or the ° C. selection 231 and subsequently display temperatures (e.g., the temperature 157 shown in FIG. 24) on the display 36 in the selected units.

The aspects of the screen shot 211 can be displayed in response to selecting the Y-key while the power selection is in focus (e.g., active) in the settings menu 217. Those aspects of the screen shot 211 include the tool bar menu 215 and power down selections 233, 235, 237, and 239. The processor 22 can determine which power down selection has been selected and subsequently cause the TID 6 to power down after the processor 22 determines an amount of time of inactivity with respect to the TID 6 or automatically after some other event. Examples of the amount of time can be 2 minutes, 5 minutes, 10 minutes or some other amount of time.

The aspects of the screen shot 213 can be displayed in response to selecting the Y-key while the about selection is in focus (e.g., active) in the settings menu 217. Those aspects of the screen shot 213 include the tool bar menu 215, a version indicator 241, a cancel selection 243, and a factory reset selection 245. The version indicator 241 can, for example, identify a version of software, hardware, or firmware of the TID 6. The processor 22 can determine cancel selection 243 has been selected and responsively return to the setting menu. The processor 22 can determine the factory reset selection 245 has been selected and perform one or more actions to set the TID 6 back to a factory setting of the TID (e.g., return the TID to a first language and a first power setting).

Figure 27:
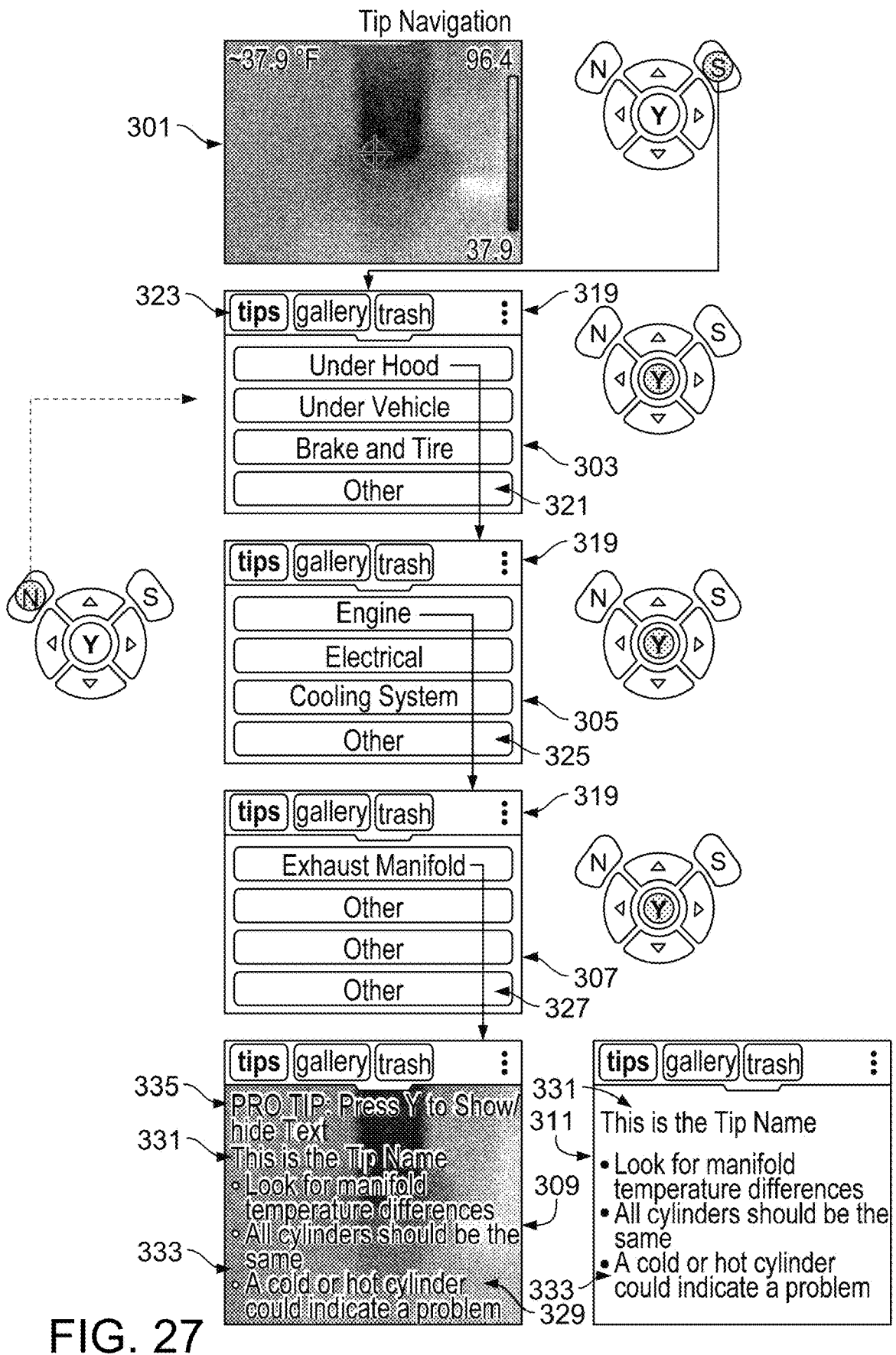
FIG. 27 shows example screenshots displayed by a thermal imaging device.
Figure 28:
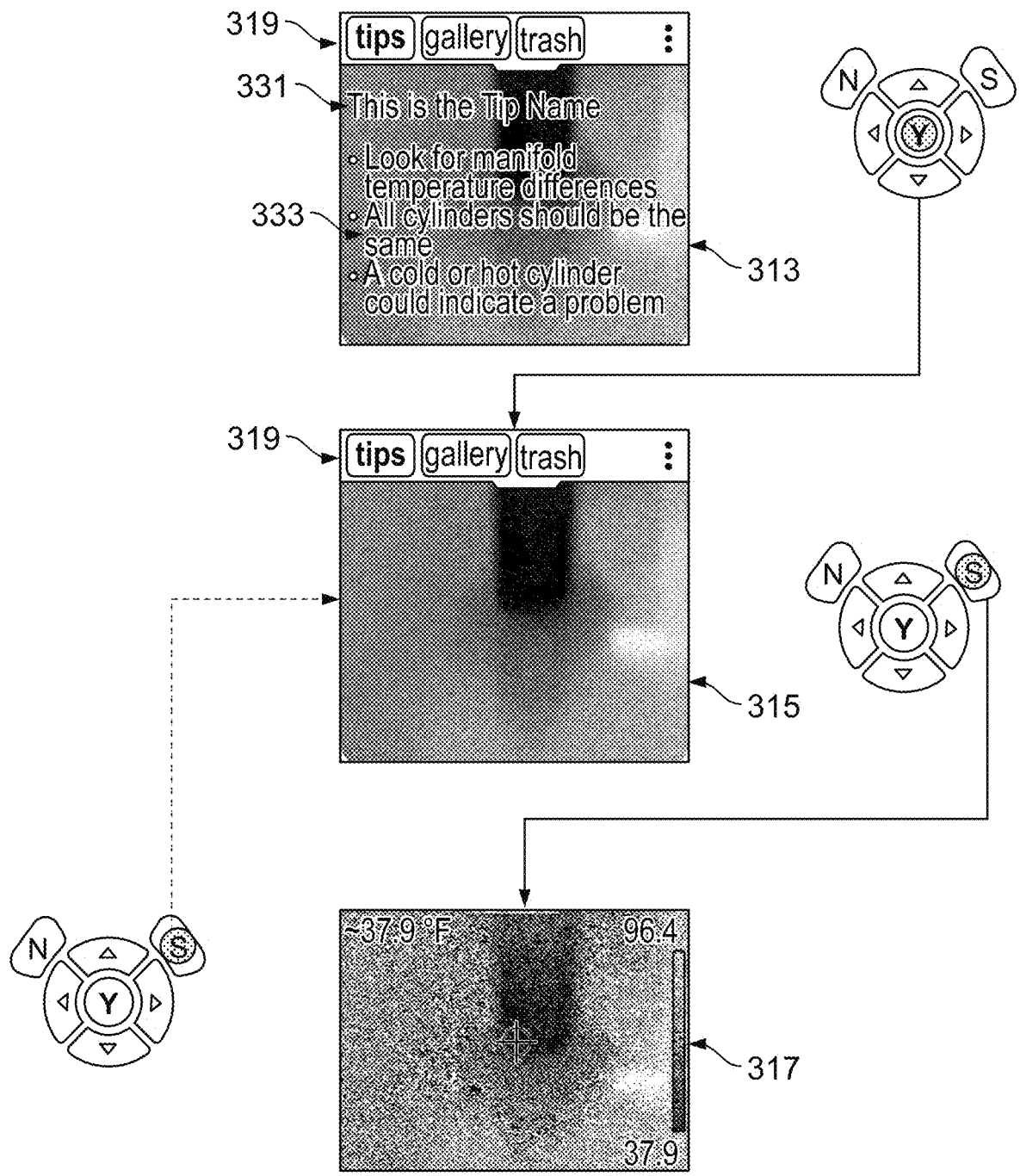
FIG. 28 shows example screenshots displayed by a thermal imaging device.

Next, FIG. 27 and FIG. 28 show example screen shots 301, 303, 305, 307, 309, 311, 313, 315, and 317 (or more simply 301 to 317) that are displayable on the display 36 during a tip navigation mode of the TID 6. The processor 22 can output displayable aspects shown in the screen shots 301 to 317 to the display 36.

The screen shot 301 represents a "live view" image (e.g., the most recent image captured by a camera of the thermal imaging device). While the live view image is displayed, the S-button of the keyboard 40 can be pressed to cause the display 36 to display the aspects shown in the screen shot 303. Those aspects include the tool bar 319 and the tips category menu 321. As an example, the first time the tips category menu 321 is initiated (e.g., displayed) since the TID 6 power is changed from the off state to the on state, a left most tool bar selection 323 for tips can be active (e.g., in focus) by default so that the tips menu is displayed on the display 36. The tips category menu 321 includes one or more tip categories selections, such as Under Hood, Under Vehicle, Brake and Tire, and Other. Other tool bar selections on the tool bar include a gallery selection and a trash selection. Other selections could be included on the tool bar 319. Pressing the S-button while a menu and the tool bar 319 are displayed can cause the display to return to displaying the live view image.

The screen shot 305 shows an example of aspects that can be displayed in response to pressing the Y-key while the Under Hood tip category selection is in focus. Those aspects include the tool bar 319 and the tips sub-category menu 325. The sub-categories include Engine, Electrical, Cooling System, and Other. Other examples of the sub-categories are also possible. Pressing the N-key while the tip sub-category menu 325 is displayed can cause the display 36 to once again display the aspects shown in the screen shot 303. The top sub-category selection (e.g., Engine) in the sub-category menu 325 can be in focus when the display begins displaying the sub-category menu 325.

The screen shot 307 shows an example of aspects that can be displayed in response to pressing the Y-key while the Engine sub-category selection is in focus. Those aspects include the tool bar 319 and a tips sub-category menu 327. The sub-categories in this menu 327 include Exhaust Manifold and Other. Other examples of the sub-categories in the menu 327 are also possible. Pressing the N-key while the tip sub-category menu 327 is displayed can cause the display 36 to once again display the aspects shown in the screen shot 305. The top sub-category selection (e.g., Exhaust Manifold) in the tips sub-category menu 327 can be in focus when the display begins displaying the tips sub-category menu 327.

If no further sub-category menus are to be shown in response to selecting a sub-category menu, the display can begin displaying a tip as shown in the screen shot 309. The tip in the screen shot 309 includes an image 329. Other tips, such as the tip shown in the screen shot 311, are textual without a corresponding image. A portion of the textual tip can include a tip name 331. Another portion of the textual tip includes the tip 333, which can state "Look for manifold temperature differences, all cylinders should be same color, and a cold or hot cylinder could indicate a problem" or some other text tip. The screen shot 309 includes the tip title 331 and the text tip 333. The tip title 331 and the text tip 333 can fade out after being displayed on the image 329 for a threshold amount of time (e.g., 2 to 3 seconds). The tip 333 comprises a diagnostic tip that pertains to a vehicle. The screen shot 309 also includes a tip 335 to guide a user using the TID 6, such as the tip: "PRO TIP: Press Y to show/hide text."

The screen shot 313 shown in FIG. 28 shows aspects displayable on the display 36 after the tip 335 fades out or is otherwise not displayed on the display 36. The aspects displayed in the screen shot 313 include the tool bar 319, the tip name 331, and the tip 333. While those aspects of the screen shot 313 are displayed, pressing of the Y-key can cause the text portion of the tip (e.g., the tip name 331 and the tip 333) to toggle off (as shown in the screen shot 315), or to toggle on if the text is not displayed.

Pressing of the S-key while a tip is displayed can cause the display 36 to return to the live image mode, as shown by the screen shot 317. The processor 22 can track the current and one or more prior states of the application display window so that the user can return to a prior screen if desired. This allows the user to quickly toggle between the camera and reference information such as a tip. The S-key or another key can be used to toggle between the live image mode and a prior display mode.

Figure 29:
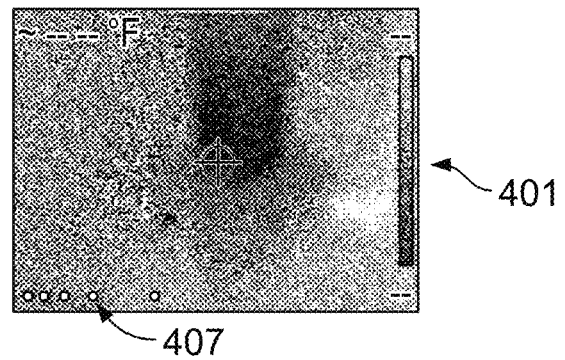
FIG. 29 shows example screenshots displayed by a thermal imaging device.
Figure 29:
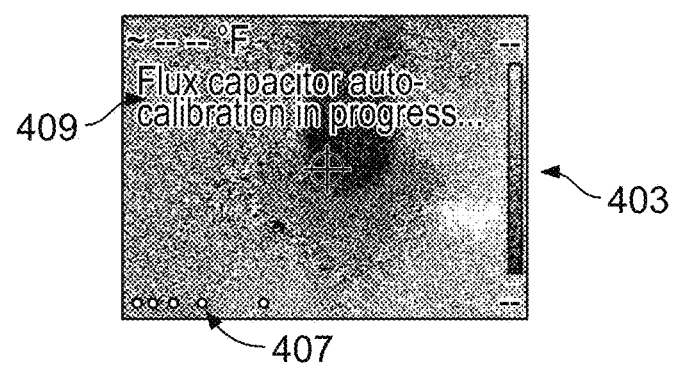
Figure 29:

Next, FIG. 29 shows example screen shots 401, 403, and 405 that are displayable on the display 36 during a recalibration mode of the TID 6. The processor 22 can output displayable aspects shown in the screen shots 401, 403, and 405 to the display 36.

The screen shot 401 includes an animated progress bar (APR) 407. The APR 407 can provide a user of the TID 6 with an indication of how much of a current recalibration event has occurred and/or how much the recalibration event remains to be performed. The screen shot 401 might not include an alphanumeric and/or textual message pertaining to the current recalibration event.

The screen shots 403 and 405 each include the APR 407 and an alphanumeric and/or textual message 409 (or more simply "the message 409"). In the screen shot 403, the APR 407 and the message 409 are not in a message box together, whereas in the screen shot 405, the APR 407 and the message 409 are in a message box. In other words, in the screen shot 403, the APR 407 and the message 409 are not proximate to one another as compared to the screen shot 405 in which the APR 407 and the message 409 are proximate to one another.

The processor 22 can execute the CRPI 42 to perform the recalibration event. The processor 22 can automatically perform the recalibration event without a user requesting performance of the recalibration event. The processor 22 can automatically perform the recalibration event in response to determining a recalibration trigger event occurred. As an example, the recalibration trigger can comprise the TID 6 powering on from the off state, or the TID 6 being exposed to an extreme temperature difference with respect to a prior temperature. Other examples of the recalibration trigger are also possible.

Figure 30:
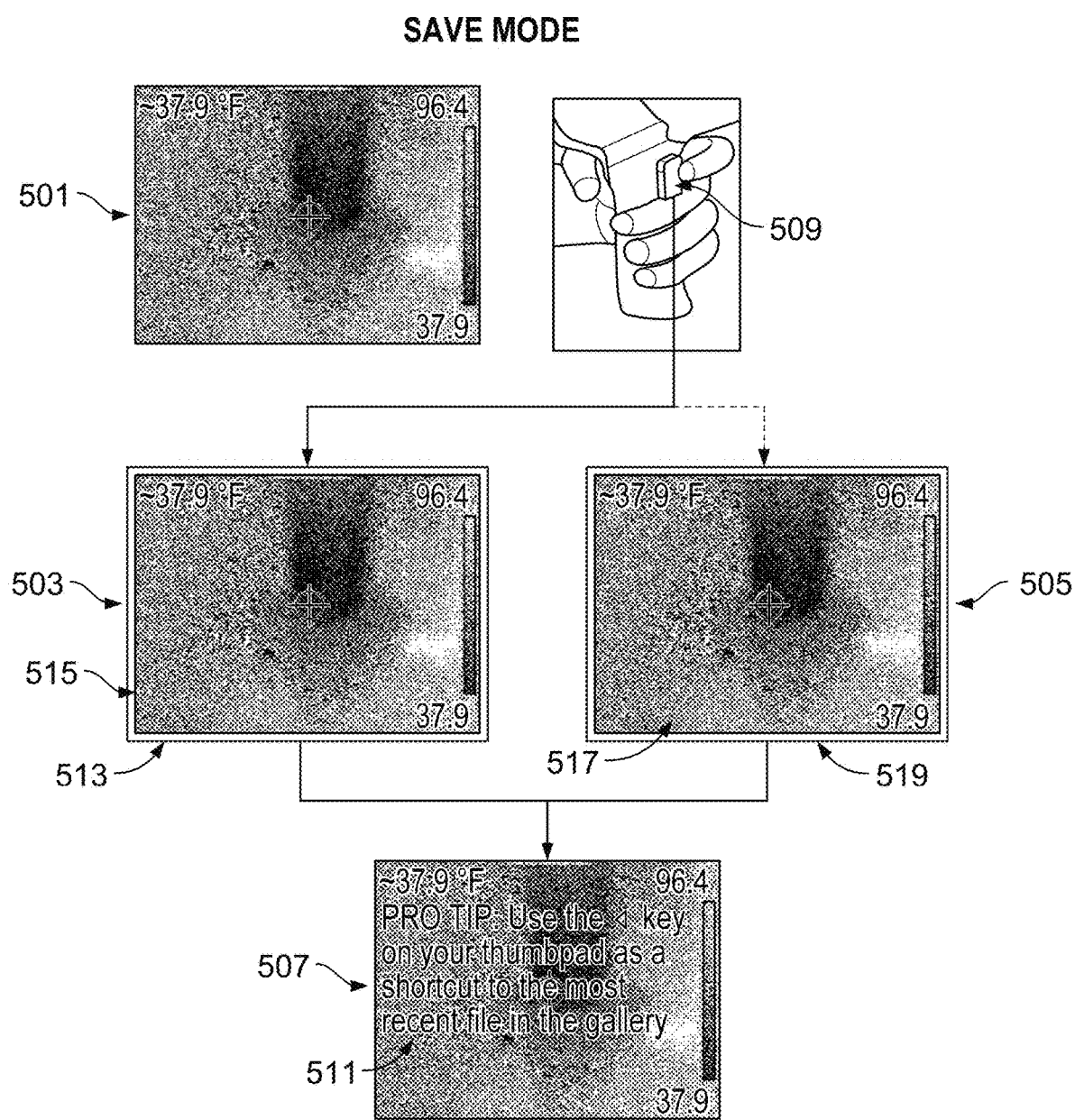
FIG. 30 shows example screenshots displayed by a thermal imaging device.

Next, FIG. 30 shows example screen shots 501, 503, 505, and 507, and use of a trigger button 509 (e.g., the image trigger 38 shown on FIG. 2). The screen shot 501 represents a "live view" image (e.g., the most recent image captured by a camera of the thermal imaging device). While the live view image is displayed, the trigger button 509 may be activated (e.g., squeezed, pushed, or pulled) to initiate capturing an image displayed on the display 36 of the TID 6. The processor 22 can determine whether the trigger button 509 is activated for longer than a trigger threshold amount of time. If the processor 22 determines that the trigger button 509 is not activated longer than the trigger threshold amount of time, the processor 22 can cause a single image 515 to be captured and displayed as shown in the screen shot 503. As an example, the trigger threshold amount of time can be 0.75 seconds or another length of time. If the processor 22 determines that the trigger button is activated longer than the trigger threshold amount of time, the processor 22 can cause multiple images (e.g., an image 517 and one or more other images) to be captured as a video. The processor 22 can cause the capturing of images to stop when the trigger button 509 is no longer activated (e.g., the trigger button 509 is no longer squeezed, pushed, or pulled). While the video is being captured and after capturing the image has stopped, a captured image of the video (e.g., the image 517) can be displayed.

The still image shown in the screen shots 503 and 505 can be overlaid upon a white background 513 and 519, respectively, or another colored background for the display threshold amount of time (e.g., 1.5 seconds or another amount of time).

After a still image is displayed in the screen shots 503 or 505 for the display threshold amount of time, the processor 22 can cause the display 36 to switch to displaying the live view image. If the live view is being displayed after displaying a captured image for less than a threshold number of time, the processor 22 can cause the display 36 to display a tip to assist the user in using the TID 6. The screen shot 507 shows a tip 511. The tip 511 states "PRO TIP: Use the ◄ key on your thumbpad as a shortcut to the most recent file in the gallery." Other examples of the tip displayed after displaying the captured image are also possible. The tip 511 can be displayed until a user requests the tip to be removed via the keyboard 40 or the tip can be removed automatically after the tip has been displayed for a threshold amount of time (e.g., 2 seconds, 3 seconds, or another amount of time). The live view image can continue to be displayed on the display 36 after the tip 511 is removed.

Figure 31:
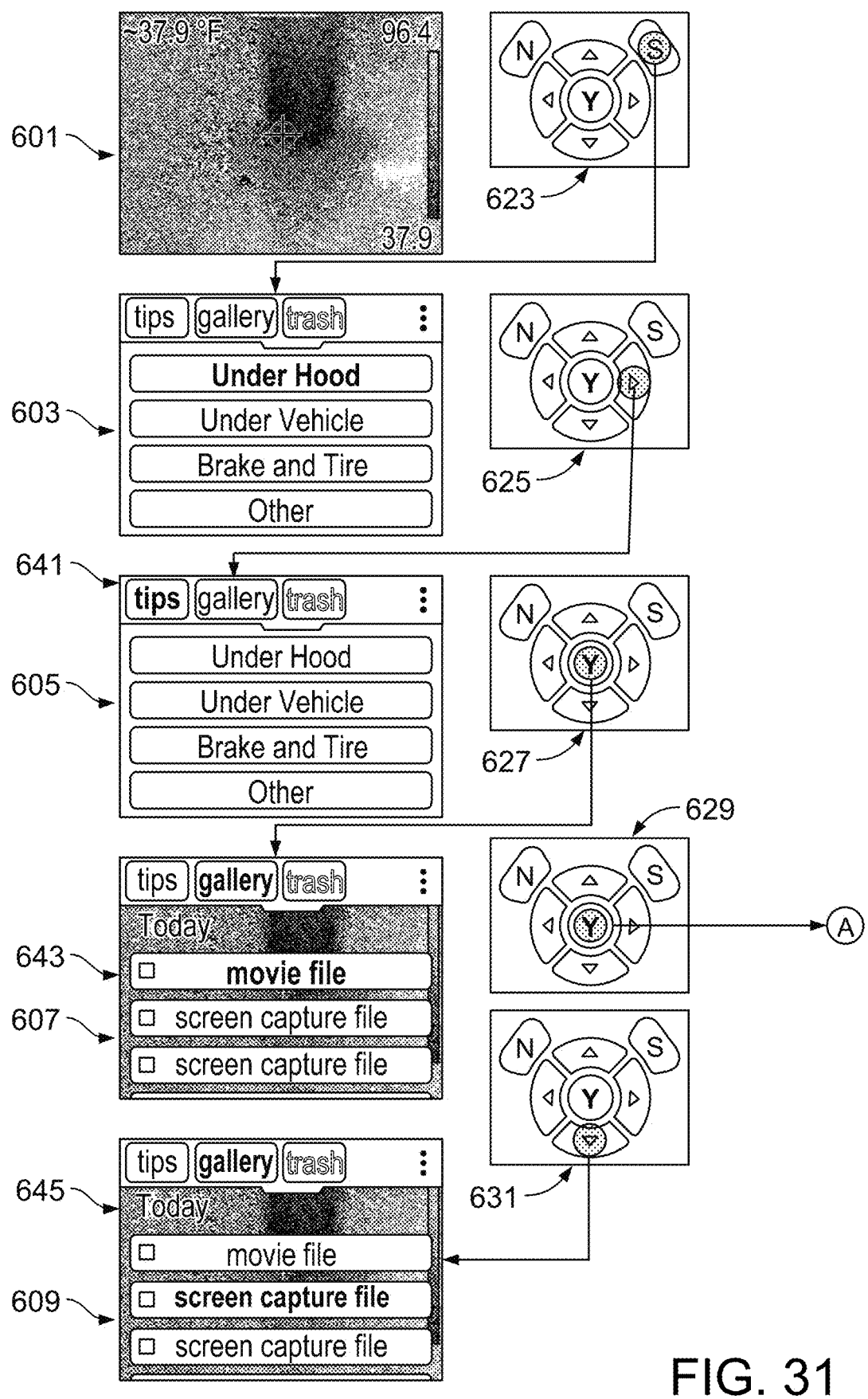
FIG. 31 shows example screenshots displayed by a thermal imaging device.
Figure 32:
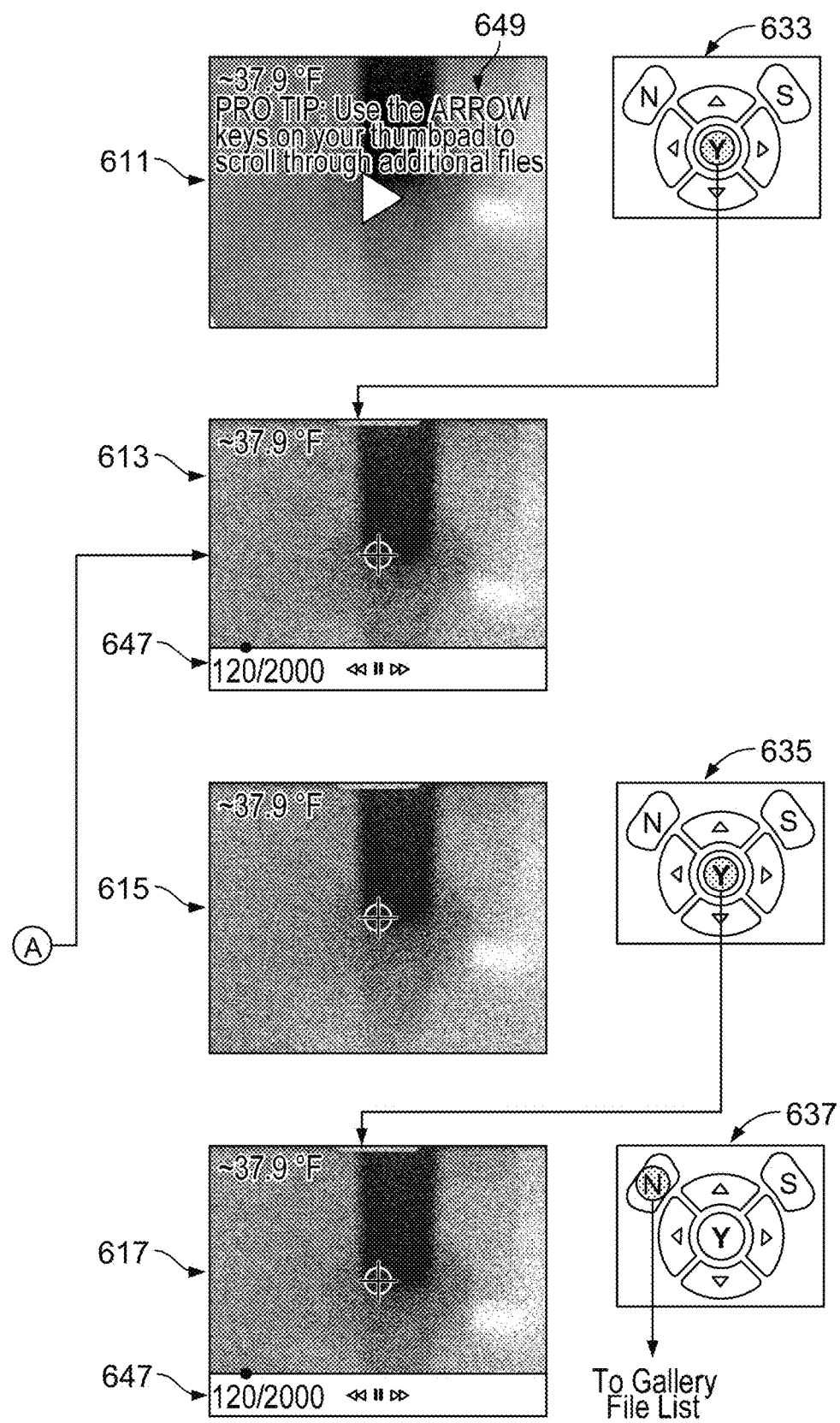
FIG. 32 shows example screenshots displayed by a thermal imaging device.
Figure 33:
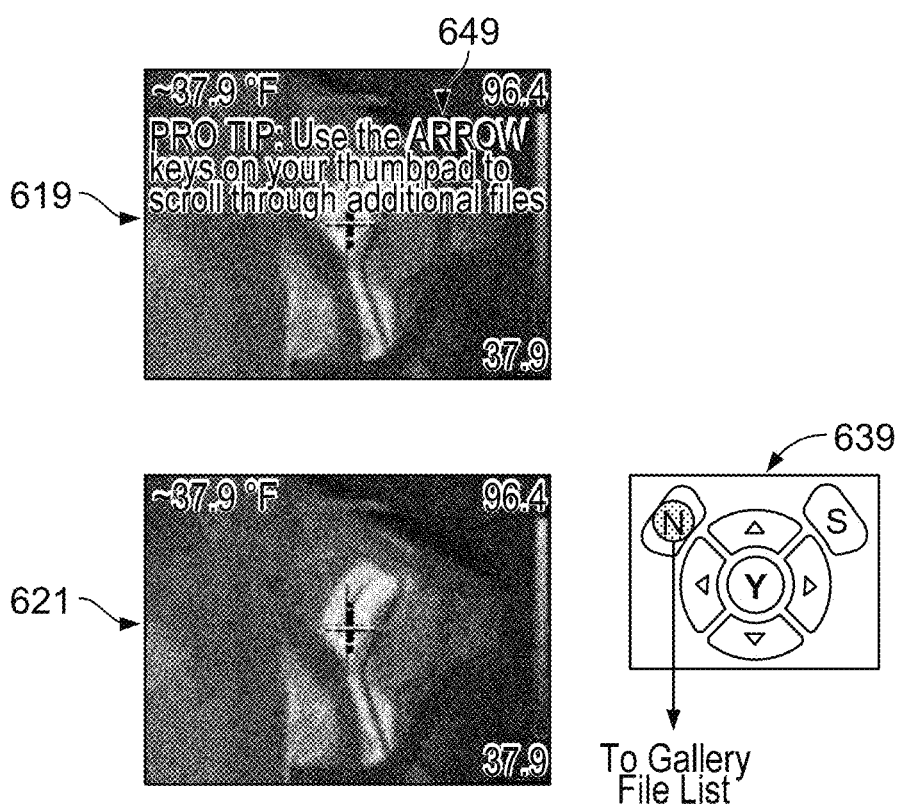
FIG. 33 shows example screenshots displayed by a thermal imaging device.

Next, FIG. 31, FIG. 32, and FIG. 33 show example screen shots 601, 603, 605, 607, 609, 611, 613, 615, 617, 619, and 621, and example uses 623, 625, 627, 629, 631, 633, 635, 637, and 639 of a keypad that causes the TID 6 to transition from displaying an image shown in one of the screen shots 601 to 619 to displaying another image shown in one of the screen shots 603 to 621. In particular, the screen shots 601 to 609 represent an example of navigating to stored files (e.g., image repair tips) from a "live view" (e.g., the most recent image captured by a camera of the TID 6). The screen shots 611 to 617 represent an example of viewing video files on the display 36 of the TID 6. The screen shots 619 and 621 represent viewing files—screen capture.

The screen shot 601 shows a "live view." Pressing the S-button 129 on a keypad (e.g., the keyboard 40) in accordance with keypad usage 623 can cause the display 36 to display a menu for selecting files with respect to vehicle systems and/or vehicle components as shown by the screen shot 603. The menu shown in the screen shot 603 can be a default menu displayed the first time a file access application is requested for the first time after the TID 6 powers to the on state. The menu in the screen shot 603 includes the following selections: Under Hood, Under Vehicle, Brake and Tire, and Other. The focus can initially be on the Under Hood selection. The selection in focus can be represented by highlighting the selection (e.g., shown darker than the other selections). The selections can represent categories of items shown in selectable files. Other examples of the selections displayed on a menu to access files are also possible.

The screen shot 605 shows the menu shown in the screen shot 603 after the right arrow key of the D-pad 125 is pressed in accordance with keypad usage 625. The focus can switch from the Under Hood selection in the menu to the toolbar 641. The left and right keys can be associated with progressing through the tool bar 641 when the tool bar is displayed. The up and down keys can be associated with progressing through the menu when the menu is displayed. The tool bar 641 can include tool selections such as Tips, Gallery, and Trash, as shown in FIG. 31. If the Y-key is pressed in accordance with keypad usage 627 while the Gallery selection is in focus, the processor 22 can cause the display 36 to display the aspects shown in the screen shot 607.

The screen shot 607 shows an active gallery. A first actionable item (i.e., "movie file" in the screen shot 607) has the focus. An image 643 shown in the background of the display is an image of a file that is currently in focus (i.e., the movie file in the screen shot 607). The image 643 can update as a user progresses through the active gallery by use of the up or down keys. For example, the screen shot 609 shows the "screen capture file" in focus in response to the down key being pressed in accordance with the key usage 631 and the background image 645 being displayed in the background.

If the Y-key is pressed in accordance with the key usage 629 when the "movie file" is in focus as shown in the screen shot 607, the display 36 may display an image of the selected movie file. In one respect, a tip 649, such as "PRO TIP: Use the ARROW keys on your thumbpad to scroll through additional files" can be displayed on the image of the selected file as shown in the screen shot 611 (see FIG. 32). If the Y-key is pressed in accordance with the key usage 633 when the selected movie is not playing, the display can begin displaying the selected movie file and media controls 647. The tip 649 can fade out after being displayed for a threshold amount of time (e.g., a 2 to 3 seconds). The media controls 647 can include a counter. The media control 647 can appear and the video can begin playing automatically in response to the Y-key being pressed. The video might stop being played after being completely played or can loop around and continue playing at the beginning of the video. The screen shot 615 shows that the media controls 647 can fade out. That fading out can occur after a few seconds of user inactivity. The screen shot 617 shows the media controls 647 can fade back in. That fading can occur in response to any key of the keyboard 40 being pressed. The left and right keys of the keyboard 40 can move the video a predetermined number of frames at a time. The left and right keys of the keyboard 40 can be pressed and held to move even quicker through the video. Pressing of the N-Key 123 in accordance with the key usage 637 can cause the display 36 to display a gallery file list, such as the list of files shown in the screen shot 607 and 609.

The screen shots 619 and 621 represent showing a different frame of a video file. The different frame could be displayed in response to selecting a different video file or selecting the left or right arrow keys, or allowing the video to play. The screen shot 619 shows the tip 649 displayed. The tip 649 can fade out such that the tip 649 is no longer displayed as shown in the screen shot 621.

Figure 34:
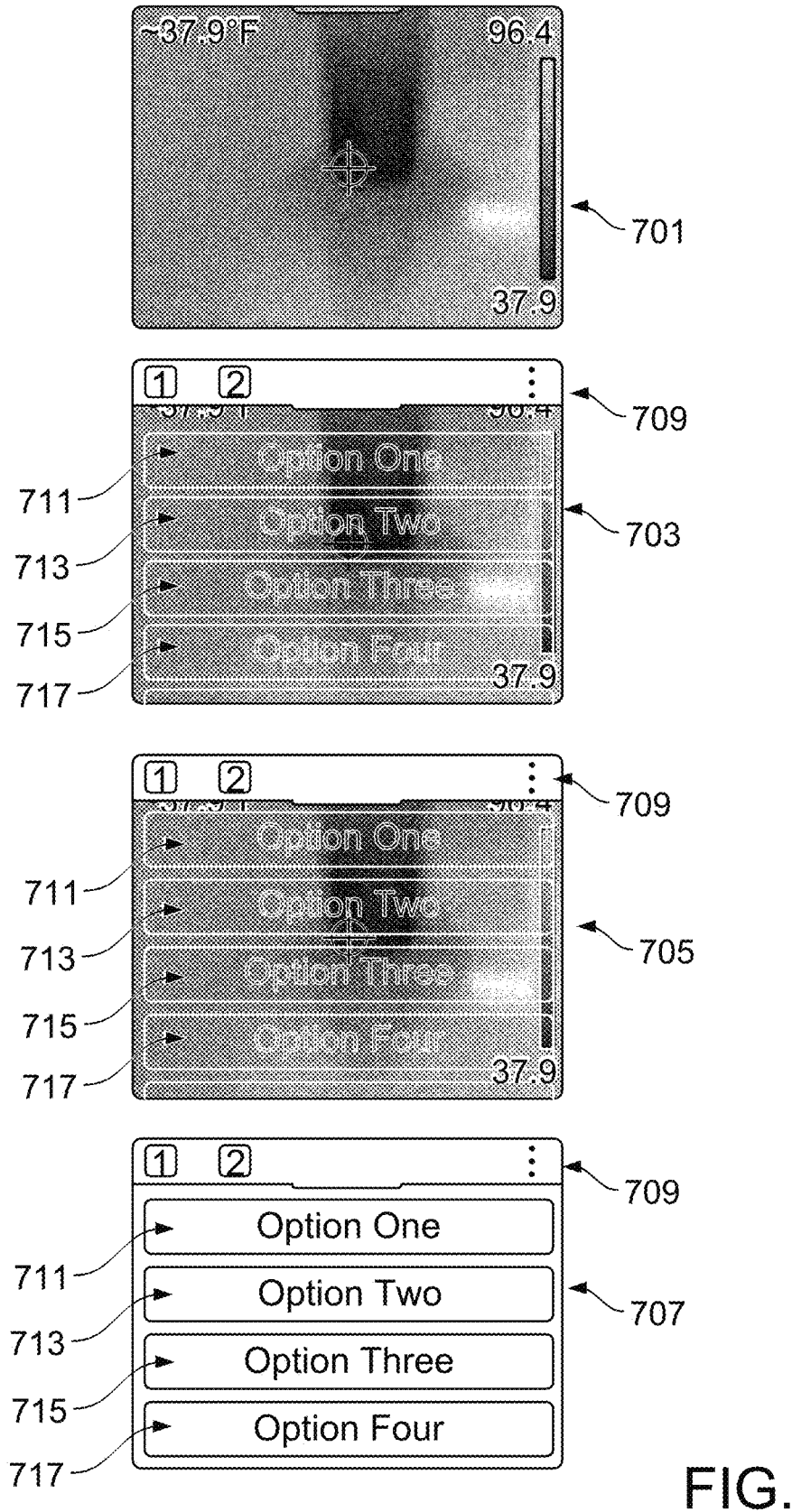
FIG. 34 shows example screenshots displayed by a thermal imaging device.

Next, FIG. 34 shows example screen shots 701, 703, 705, and 707 that are displayable on the display 36 during an animated transition mode of the TID 6. The processor 22 can output displayable aspects shown in the screen shots 701 to 707 to the display 36.

The screen shot 701 comprises an image captured by a camera (e.g., the camera 30). The screen shot 701 might not include a tool bar or a menu. A use of a keyboard (e.g., the keyboard 40) can cause the processor 22 to execute the CRPI 42 to perform an animated transition from the displayed image to a fully rendered menu shown in the screen shot 707. The screen shot 703 represents a toolbar 709 sliding downwards and a menu with menu items 711, 713, 715, and 717 fading in. As the menu items 711, 713, 715, and 717 fade in (e.g., become more viewable), the camera image fades out (e.g., becomes less viewable). The screen shot 705 represents the toolbar 709 fully visible and the menu items 711, 713, 715, and 717 continuing to fade in. The screen shot 707 shows the fully rendered menu in which the menu items 711, 713, 715, and 717 are no longer fading in and the image is no longer fading out.

In some examples, the TID 6 may be configured to operate in a demonstration ("Demo") mode. The demonstration mode may involve the TID 6 displaying a predetermined (e.g., scripted) sequence of images and/or information that shows a user ways in which the TID 6 might be useful. The images and information displayed during the demonstration mode may be accessed from the CRM 28 or from the SCS 10.

For example, the TID 6 may display a prompt for the user to turn the rear defroster "grid" of the vehicle 4 on and use the TID 6 to inspect for breaks in the grid or for no grid at all. The TID 6 might display a thermal image of a malfunctioning rear window defroster showing a "cold spot" representing an open circuit within the grid. A caption might read "known bad rear windows defroster." In another example the caption might read "known good windows defroster" and a thermal image of a normally functioning rear window defroster may be displayed.

Similarly, the TID 6 may display a prompt for the user to inspect the vehicle 4 at normal operating temperature and use the TID 6 to identify a noisy carrier bearing of a differential of the vehicle 4. The TID 6 might display a thermal image of a malfunctioning differential. A caption might read "known bad differential." In another example the caption might read "known good differential" and the displayed thermal image may be of a normally functioning differential.

Similarly, the TID 6 may display a prompt for the user to use the TID 6 to monitor pulley temperatures of a water pump. The TID 6 may further display a message stating that excessive temperatures may indicate a bearing issue. The TID 6 might display a thermal image of a malfunctioning water pump bearing. A caption might read "known bad water pump bearing." In another example the caption might read "known good water pump bearing" and the displayed thermal image may be of a normally functioning water pump bearing.

Similarly, the TID 6 may display a prompt for the user to use the TID 6 to inspect a seat heater of the vehicle 4. The TID 6 may further display a message stating that seat heater will increase in temperature and reveal the heater grid underneath the seat. The TID 6 may further display a prompt to use the TID 6 to inspect for breaks in the grid or no grid at all. The TID 6 might display a thermal image of a malfunctioning seat heater. A caption might read "known bad heated seat." In another example the caption might read "known good heated seat" and the displayed image may correspond to a normally functioning seat heater.

Similarly, the TID 6 may display a prompt for the user to use the TID 6 to inspect an alternator of the vehicle 4. The TID 6 may further display a message stating that a charging (normally functioning) alternator will display a higher temperature than a non-charging (malfunctioning) alternator. The TID 6 might display a thermal image of a malfunctioning or a normally functioning alternator. A caption might read "known good charging alternator" or "known bad charging alternator," as appropriate.

The demonstration mode may be initiated by navigating drop down menus or other features of a user interface of the TID 6.

A person having ordinary skill in the art will understand that the thermal imaging device can transition from the fully rendered menu of the screen shot 707 to the live shot captured by the camera 30 in a reverse order of the screen shot 707, the screen shot 705, the screen shot 703, and the screen shot 701. A person having ordinary skill in the art will further understand that additional screen shots can be captured between the image view and the fully rendered menu or vice versa.

IV. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a non-transitory computer-readable medium storing program instructions, that when executed by a processor of a machine cause a set of functions to be performed, the set of functions comprising the features or functions of the aspects and embodiments described herein.

Embodiments of the present disclosure may thus relate to one of the enumerated example embodiments (EEEs) listed below.

EEE 1 is a method performed by a thermal imaging device, the method comprising: capturing a thermal image of a vehicle; displaying the thermal image within a first region of a display of the thermal imaging device; and displaying information related to servicing the vehicle within a second region of the display that is distinct from the first region.

EEE 2 is the method of EEE 1, wherein the displayed information comprises a thermal image of a normally functioning example of the vehicle component.

EEE 3 is the method of any of EEEs 1 or 2, wherein the displayed information comprises a thermal image of a normally functioning example of the vehicle component.

EEE 4 is the method of any of EEEs 1-3, further comprising sending the captured thermal image of the vehicle to a server computing system.

EEE 5 is the method of any of EEEs 1-4, further comprising receiving the displayed information from a server computing system.

EEE 6 is the method of any of EEEs 1-5, wherein the displayed information comprises a thermal image of another vehicle that was received by the server from a second thermal imaging device.

EEE 7 is the method of any of EEEs 1-6, further comprising receiving the displayed information from a computer readable medium of the thermal imaging device.

EEE 8 is the method of any of EEEs 1-7, further comprising: receiving, via a user interface, input representing a selection of a vehicle component; and identifying information that is associated with the selected vehicle component, wherein the displayed information comprises the identified information.

EEE 9 is the method of EEE 8, wherein the received input further indicates a symptom of the vehicle component, and wherein the identified information is related to the symptom.

EEE 10 is the method of EEE 8, wherein the received input further indicates a make, a model, or a year of the vehicle, and wherein the identified information is related to the make, the model, or the year of the vehicle.

EEE 11 is the method of any of EEEs 1-10, wherein the displayed information comprises textual suggestions for repairing the vehicle.

EEE 12 is the method of any of EEEs 1-11, wherein the thermal image is captured in response to detecting that a trigger of the thermal imaging device has been squeezed.

EEE 13 is the method of EEE 12, wherein capturing the thermal image comprises capturing a thermal video stream in response to detecting that the trigger has been squeezed, the method further comprising: ceasing capturing the thermal video stream in response to detecting that the trigger has been released.

EEE 14 is a non-transitory computer readable medium storing instructions that, when executed by a thermal imaging device, cause the thermal imaging device to perform functions comprising: capturing a thermal image of a vehicle; displaying the thermal image within a first region of a display of the thermal imaging device; and displaying information related to servicing the vehicle within a second region of the display that is distinct from the first region.

EEE 15 is the non-transitory computer readable medium of EEE 14, wherein the displayed information comprises a thermal image of a normally functioning example of the vehicle component.

EEE 16 is the non-transitory computer readable medium of any of EEEs 14 or 15, wherein the displayed information comprises a thermal image of a normally functioning example of the vehicle component.

EEE 17 is the non-transitory computer readable medium of any of EEEs 14-16, the functions further comprising sending the captured thermal image of the vehicle to a server computing system.

EEE 18 is the non-transitory computer readable medium of any of EEEs 14-17, the functions further comprising receiving the displayed information from a server computing system.

EEE 19 is the non-transitory computer readable medium of any of EEEs 14-18, wherein the displayed information comprises a thermal image of another vehicle that was received by the server from a second thermal imaging device.

EEE 20 is the non-transitory computer readable medium of any of EEEs 14-19, the functions further comprising receiving the displayed information from a computer readable medium of the thermal imaging device.

EEE 21 is the non-transitory computer readable medium of any of EEEs 14-20, the functions further comprising: receiving, via a user interface, input representing a selection of a vehicle component; and identifying information that is associated with the selected vehicle component, wherein the displayed information comprises the identified information.

EEE 22 is the non-transitory computer readable medium of EEE 21, wherein the received input further indicates a symptom of the vehicle component, and wherein the identified information is related to the symptom.

EEE 23 is the non-transitory computer readable medium of EEE 21, wherein the received input further indicates a make, a model, or a year of the vehicle, and wherein the identified information is related to the make, the model, or the year of the vehicle.

EEE 24 is the non-transitory computer readable medium of any of EEEs 14-23, wherein the displayed information comprises textual suggestions for repairing the vehicle.

EEE 25 is the non-transitory computer readable medium of any of EEEs 14-24, wherein the thermal image is captured in response to detecting that a trigger of the thermal imaging device has been squeezed.

EEE 26 is the non-transitory computer readable medium of EEE 25, wherein capturing the thermal image comprises capturing a thermal video stream in response to detecting that the trigger has been squeezed, the functions further comprising: ceasing capturing the thermal video stream in response to detecting that the trigger has been released.

EEE 27 is a thermal imaging device comprising one or more processors, a thermal image sensor, and a non-transitory computer readable medium storing instructions that, when executed by the one or more processors, cause the thermal imaging device to perform functions comprising: capturing a thermal image of a vehicle; displaying the thermal image within a first region of a display of the thermal imaging device; and displaying information related to servicing the vehicle within a second region of the display that is distinct from the first region.

EEE 28 is the thermal imaging device of EEE 27, wherein the displayed information comprises a thermal image of a normally functioning example of the vehicle component.

EEE 29 is the thermal imaging device of any of EEEs 27 or 28, wherein the displayed information comprises a thermal image of a normally functioning example of the vehicle component.

EEE 30 is the thermal imaging device of any of EEEs 27-29, the functions further comprising sending the captured thermal image of the vehicle to a server computing system.

EEE 31 is the thermal imaging device of any of EEEs 27-30, the functions further comprising receiving the displayed information from a server computing system.

EEE 32 is the thermal imaging device of any of EEEs 27-31, wherein the displayed information comprises a thermal image of another vehicle that was received by the server from a second thermal imaging device.

EEE 33 is the thermal imaging device of any of EEEs 27-32, the functions further comprising receiving the displayed information from a computer readable medium of the thermal imaging device.

EEE 34 is the thermal imaging device of any of EEEs 27-33, the functions further comprising: receiving, via a user interface, input representing a selection of a vehicle component; and identifying information that is associated with the selected vehicle component, wherein the displayed information comprises the identified information.

EEE 35 is the thermal imaging device of EEE 34, wherein the received input further indicates a symptom of the vehicle component, and wherein the identified information is related to the symptom.

EEE 36 is the thermal imaging device of EEE 34, wherein the received input further indicates a make, a model, or a year of the vehicle, and wherein the identified information is related to the make, the model, or the year of the vehicle.

EEE 37 is the thermal imaging device of any of EEEs 27-36, wherein the displayed information comprises textual suggestions for repairing the vehicle.

EEE 38 is the thermal imaging device of any of EEEs 27-37, wherein the thermal image is captured in response to detecting that a trigger of the thermal imaging device has been squeezed.

EEE 39 is the thermal imaging device of EEE 38, wherein capturing the thermal image comprises capturing a thermal video stream in response to detecting that the trigger has been squeezed, the functions further comprising: ceasing capturing the thermal video stream in response to detecting that the trigger has been released.

EEE 40 is a method performed by a thermal imaging device, the method comprising: capturing a thermal image; displaying the captured thermal image within a first region of a display of the thermal imaging device, wherein the displayed thermal image conforms to a first color palette that maps temperatures to a color or a brightness level; displaying one or more color palette icons within a second region of the display that is distinct from the first region, wherein the one or more color palette icons respectively represent additional color palettes that map temperatures to a color or a brightness level; receiving input representing a selection of a color palette icon of the one or more color palette icons; and displaying, within the first region, a thermal image that conforms to a second color palette that corresponds to the selected color palette icon.

EEE 41 is the method of EEE 40, wherein the input comprises a drag-and-drop input.

EEE 42 is the method of any of EEEs 40 or 41, further comprising modifying the captured thermal image to conform to the second color palette, wherein the displayed thermal image that conforms to the second color palette is the captured thermal image that is modified to conform to the second color palette.

EEE 43 is the method of any of EEEs 40-42, further comprising replacing, within the display, the selected color palette icon with a color palette icon that corresponds to the first color palette.

EEE 44 is the method of any of EEEs 40-43, wherein the selected color palette icon comprises a compressed version of the captured thermal image that conforms to the second color palette, the method further comprising: modifying the compressed version of the thermal image to conform with the first color palette.

EEE 45 is a non-transitory computer readable medium storing instructions that, when executed by a thermal imaging device, cause the thermal imaging device to perform functions comprising: capturing a thermal image; displaying the captured thermal image within a first region of a display of the thermal imaging device, wherein the displayed thermal image conforms to a first color palette that maps temperatures to a color or a brightness level; displaying one or more color palette icons within a second region of the display that is distinct from the first region, wherein the one or more color palette icons respectively represent additional color palettes that map temperatures to a color or a brightness level; receiving input representing a selection of a color palette icon of the one or more color palette icons; and displaying, within the first region, a thermal image that conforms to a second color palette that corresponds to the selected color palette icon.

EEE 46 is the non-transitory computer readable medium of EEE 45, wherein the input comprises a drag-and-drop input.

EEE 47 is the non-transitory computer readable medium of any of EEEs 45 or 46, the functions further comprising modifying the captured thermal image to conform to the second color palette, wherein the displayed thermal image that conforms to the second color palette is the captured thermal image that is modified to conform to the second color palette.

EEE 48 is the non-transitory computer readable medium of any of EEEs 45-47, the functions further comprising replacing, within the display, the selected color palette icon with a color palette icon that corresponds to the first color palette.

EEE 49 is the non-transitory computer readable medium of any of EEEs 45-48, wherein the selected color palette icon comprises a compressed version of the captured thermal image that conforms to the second color palette, the functions further comprising: modifying the compressed version of the thermal image to conform with the first color palette.

EEE 50 is a thermal imaging device comprising one or more processors, a thermal image sensor, and a non-transitory computer readable medium storing instructions that, when executed by the one or more processors, cause the thermal imaging device to perform functions comprising: capturing a thermal image; displaying the captured thermal image within a first region of a display of the thermal imaging device, wherein the displayed thermal image conforms to a first color palette that maps temperatures to a color or a brightness level; displaying one or more color palette icons within a second region of the display that is distinct from the first region, wherein the one or more color palette icons respectively represent additional color palettes that map temperatures to a color or a brightness level; receiving input representing a selection of a color palette icon of the one or more color palette icons; and displaying, within the first region, a thermal image that conforms to a second color palette that corresponds to the selected color palette icon.

EEE 51 is the thermal imaging device of EEE 50, wherein the input comprises a drag-and-drop input.

EEE 52 is the thermal imaging device of any of EEEs 50 or 51, the functions further comprising modifying the captured thermal image to conform to the second color palette, wherein the displayed thermal image that conforms to the second color palette is the captured thermal image that is modified to conform to the second color palette.

EEE 53 is the thermal imaging device of any of EEEs 50-52, the functions further comprising replacing, within the display, the selected color palette icon with a color palette icon that corresponds to the first color palette.

EEE 54 is the thermal imaging device of any of EEEs 50-53, wherein the selected color palette icon comprises a compressed version of the captured thermal image that conforms to the second color palette, the functions further comprising: modifying the compressed version of the thermal image to conform with the first color palette.

EEE 55 is a method performed by a thermal imaging device, the method comprising: capturing a first thermal image; displaying the first thermal image within a first region of a display of the thermal imaging device; displaying, within a second region of the display that is distinct from the first region, one or more second thermal images captured by the thermal imaging device, wherein the one or more second thermal images are compressed to be smaller than the first thermal image; receiving input representing a selection of a thermal image of the one or more second thermal images; and in response to receiving the input, replacing, within the first region of the display, the first thermal image with an enlarged version of the selected thermal image, wherein the enlarged version of the selected thermal image is equal in size to the displayed first thermal image.

EEE 56 is the method of EEE 55, further comprising replacing, within the second region of the display, the selected thermal image with a compressed version of the first thermal image.

EEE 57 is a non-transitory computer readable medium storing instructions that, when executed by a thermal imaging device, cause the thermal imaging device to perform functions comprising: capturing a first thermal image; displaying the first thermal image within a first region of a display of the thermal imaging device; displaying, within a second region of the display that is distinct from the first region, one or more second thermal images captured by the thermal imaging device, wherein the one or more second thermal images are compressed to be smaller than the first thermal image; receiving input representing a selection of a thermal image of the one or more second thermal images; and in response to receiving the input, replacing, within the first region of the display, the first thermal image with an enlarged version of the selected thermal image, wherein the enlarged version of the selected thermal image is equal in size to the displayed first thermal image.

EEE 58 is the non-transitory computer readable medium of EEE 57, the functions further comprising replacing, within the second region of the display, the selected thermal image with a compressed version of the first thermal image.

EEE 59 is a thermal imaging device comprising one or more processors, a thermal image sensor, and a non-transitory computer readable medium storing instructions that, when executed by the one or more processors, cause the thermal imaging device to perform functions comprising: capturing a first thermal image; displaying the first thermal image within a first region of a display of the thermal imaging device; displaying, within a second region of the display that is distinct from the first region, one or more second thermal images captured by the thermal imaging device, wherein the one or more second thermal images are compressed to be smaller than the first thermal image; receiving input representing a selection of a thermal image of the one or more second thermal images; and in response to receiving the input, replacing, within the first region of the display, the first thermal image with an enlarged version of the selected thermal image, wherein the enlarged version of the selected thermal image is equal in size to the displayed first thermal image.

EEE 60 is the thermal imaging device of EEE 59, the functions further comprising replacing, within the second region of the display, the selected thermal image with a compressed version of the first thermal image.

EEE 61 is the method of any of EEEs 1-13, wherein capturing the thermal image of the vehicle comprises capturing a thermal image of a particular component of the vehicle.

EEE 62 is the non-transitory computer readable medium of any of EEEs 14-26, wherein capturing the thermal image of the vehicle comprises capturing a thermal image of a particular component of the vehicle.

EEE 63 is the thermal imaging device of any of EEEs 27-39, wherein capturing the thermal image of the vehicle comprises capturing a thermal image of a particular component of the vehicle.

We claim:
1. A method performed by a thermal imaging device, the method comprising:
   capturing a thermal image;
   displaying the captured thermal image within a first region of a display of the thermal imaging device, wherein the displayed thermal image conforms to a first color palette that maps temperatures to one or more of (i) a color or (ii) a brightness level;
   displaying one or more color palette icons within a second region of the display that is distinct from the first region, wherein the one or more color palette icons respectively represent additional color palettes that map temperatures to one or more of (i) a color or (ii) a brightness level;

receiving input representing a selection of a color palette icon of the one or more color palette icons;

responsive to receiving the input, displaying, within the first region, the captured thermal image conforming to a second color palette that corresponds to the selected color palette icon; and replacing, within the display, the selected color palette icon with a color palette icon that corresponds to the first color palette.

2. The method of claim 1, wherein receiving the input comprises receiving a touch and drag input.

3. The method of claim 2, wherein the touch and drag input begins at the selected color palette and ends within the first region of the display.

4. The method of claim 1,
wherein the selected color palette icon comprises a compressed version of the captured thermal image that conforms to the second color palette, and
wherein replacing the selected color palette icon comprises displaying a compressed version of the captured thermal image that conforms to the first color palette.

5. The method of claim 1, wherein first region is larger than the second region.

6. The method of claim 1, wherein receiving the input comprises receiving the input via a touchscreen of the thermal imaging device.

7. A thermal imaging device comprising:
one or more processors;
a display;
a thermal image sensor; and
a non-transitory computer readable medium storing instructions that, when executed by the one or more processors, cause the thermal imaging device to perform functions comprising:
  capturing a thermal image with the thermal image sensor;
  displaying the captured thermal image within a first region of the display, wherein the displayed thermal image conforms to a first color palette that maps temperatures to one or more of (i) a color or (ii) a brightness level;
  displaying one or more color palette icons within a second region of the display that is distinct from the first region, wherein the one or more color palette icons respectively represent additional color palettes that map temperatures to one or more of (i) a color or (ii) a brightness level;
  receiving input representing a selection of a color palette icon of the one or more color palette icons;
  responsive to receiving the input, displaying, within the first region, the captured thermal image conforming to a second color palette that corresponds to the selected color palette icon; and
  replacing, within the display, the selected color palette icon with a color palette icon that corresponds to the first color palette.

8. The thermal imaging device of claim 7, wherein receiving the input comprises receiving a touch and drag input.

9. The thermal imaging device of claim 8, wherein the touch and drag input begins at the selected color palette and ends within the first region of the display.

10. The thermal imaging device of claim 7,
wherein the selected color palette icon comprises a compressed version of the captured thermal image that conforms to the second color palette, and
wherein replacing the selected color palette icon comprises displaying a compressed version of the captured thermal image that conforms to the first color palette.

11. The thermal imaging device of claim 7, wherein first region is larger than the second region.

12. The thermal imaging device of claim 7, wherein receiving the input comprises receiving the input via a touchscreen of the thermal imaging device.

13. A non-transitory computer readable medium storing instructions that, when executed by a thermal imaging device, cause the thermal imaging device to perform functions comprising:
capturing a thermal image;
displaying the captured thermal image within a first region of a display of the thermal imaging device, wherein the displayed thermal image conforms to a first color palette that maps temperatures to one or more of (i) a color or (ii) a brightness level;
displaying one or more color palette icons within a second region of the display that is distinct from the first region, wherein the one or more color palette icons respectively represent additional color palettes that map temperatures to one or more of (i) a color or (ii) a brightness level;
receiving input representing a selection of a color palette icon of the one or more color palette icons;
responsive to receiving the input, displaying, within the first region, the captured thermal image conforming to a second color palette that corresponds to the selected color palette icon; and
replacing, within the display, the selected color palette icon with a color palette icon that corresponds to the first color palette.

14. The non-transitory computer readable medium of claim 13, wherein receiving the input comprises receiving a touch and drag input.

15. The non-transitory computer readable medium of claim 14, wherein the touch and drag input begins at the selected color palette and ends within the first region of the display.

* * * * *